United States Patent
Saka

(10) Patent No.: US 10,318,221 B2
(45) Date of Patent: Jun. 11, 2019

(54) IMAGE FORMING APPARATUS AND NON-TRANSITORY COMPUTER-READABLE RECORDING MEDIUM ENCODED WITH JOB EXECUTION CONTROL PROGRAM

(71) Applicant: KONICA MINOLTA, INC., Chiyoda-ku, Tokyo (JP)

(72) Inventor: Masaaki Saka, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/622,201

(22) Filed: Jun. 14, 2017

(65) Prior Publication Data
US 2017/0371606 A1 Dec. 28, 2017

(30) Foreign Application Priority Data

Jun. 24, 2016 (JP) .................................. 2016-125229

(51) Int. Cl.
| | |
|---|---|
| G06F 3/12 | (2006.01) |
| H04N 1/00 | (2006.01) |
| G06K 9/00 | (2006.01) |
| G06K 15/02 | (2006.01) |

(52) U.S. Cl.
CPC ............ G06F 3/1263 (2013.01); G06F 3/121 (2013.01); G06F 3/1284 (2013.01); G06F 3/1294 (2013.01); G06K 9/00885 (2013.01); H04N 1/00323 (2013.01); H04N 1/00923 (2013.01); H04N 1/00954 (2013.01); G06K 2009/00939 (2013.01); H04N 2201/0094 (2013.01)

(58) Field of Classification Search
None
See application file for complete search history.

(56) References Cited

U.S. PATENT DOCUMENTS

| | | | |
|---|---|---|---|
| 6,219,502 B1 | 4/2001 | Osari et al. | |
| 2015/0269464 A1* | 9/2015 | Atsumi | G06K 15/4095 |
| | | | 358/1.16 |
| 2018/0055396 A1* | 3/2018 | Bessho | A61B 5/0456 |

FOREIGN PATENT DOCUMENTS

| | | |
|---|---|---|
| JP | 09055821 A | 2/1997 |
| JP | 11188948 A | 7/1999 |
| JP | 2014111313 A | 6/2014 |
| JP | 2016020933 A | 2/2016 |

* cited by examiner

*Primary Examiner* — Beniyam Menberu
(74) *Attorney, Agent, or Firm* — Holtz, Holtz & Volek PC

(57) ABSTRACT

An image forming apparatus includes a measurer that measures biometric information of a user, an analyzer that analyzes the measured biometric information, a job accepter that accepts jobs, a job executer that executes the jobs accepted by the job accepter, a hardware processor configured to estimate a job execution time period during which the job executor executes each of at least one of a plurality of jobs accepted by the job acceptor, to estimate a finish time point at which the analyzer finishes the analysis, and, in response to start of measurement of the biometric information by the measurer, to change execution order of a relating job, which relates to the user who is a subject of the measurement by the measurer, among the plurality of jobs such that a period during which the relating job is executed and the finish time point have a predetermined relationship.

14 Claims, 16 Drawing Sheets

F I G. 7
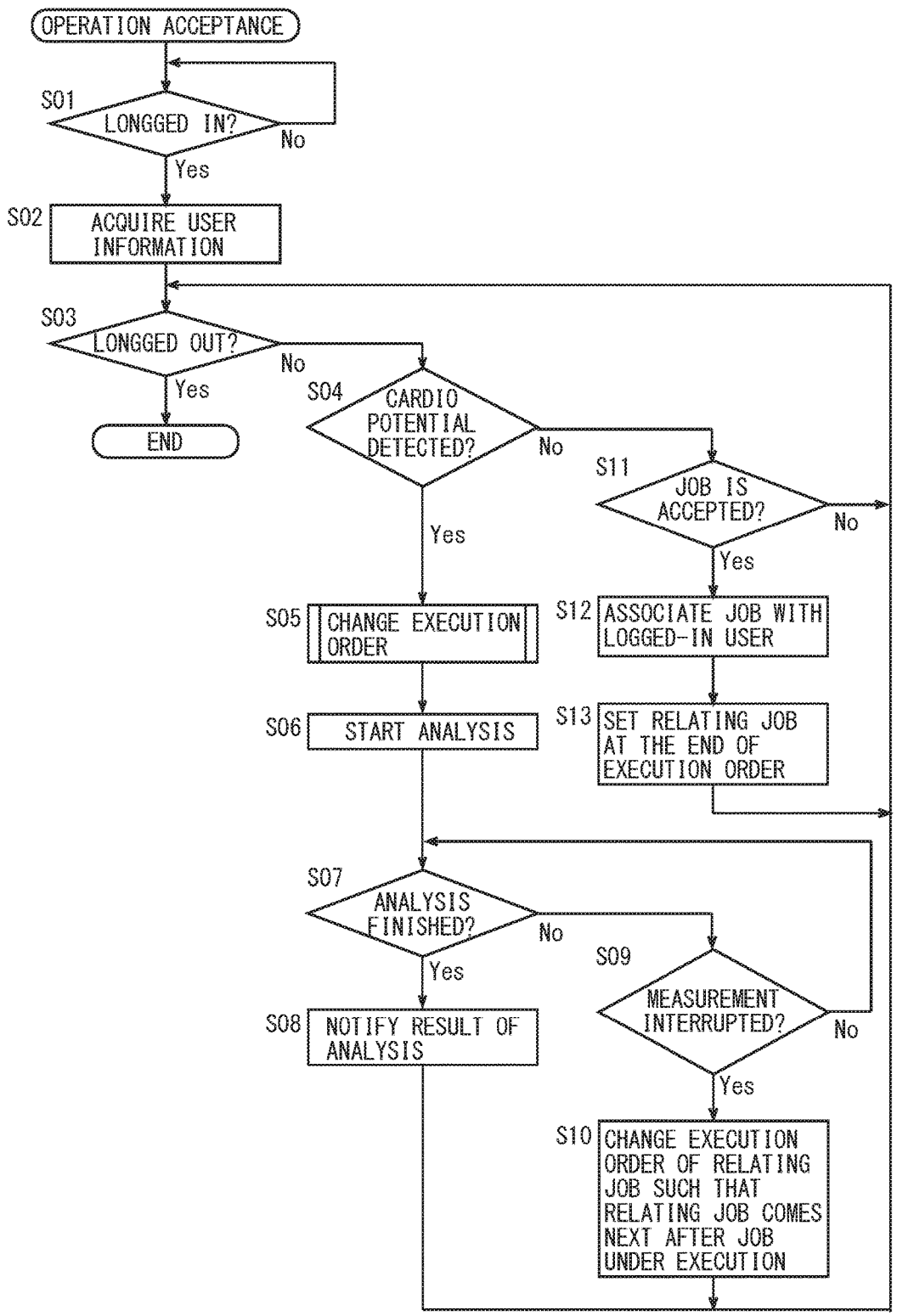

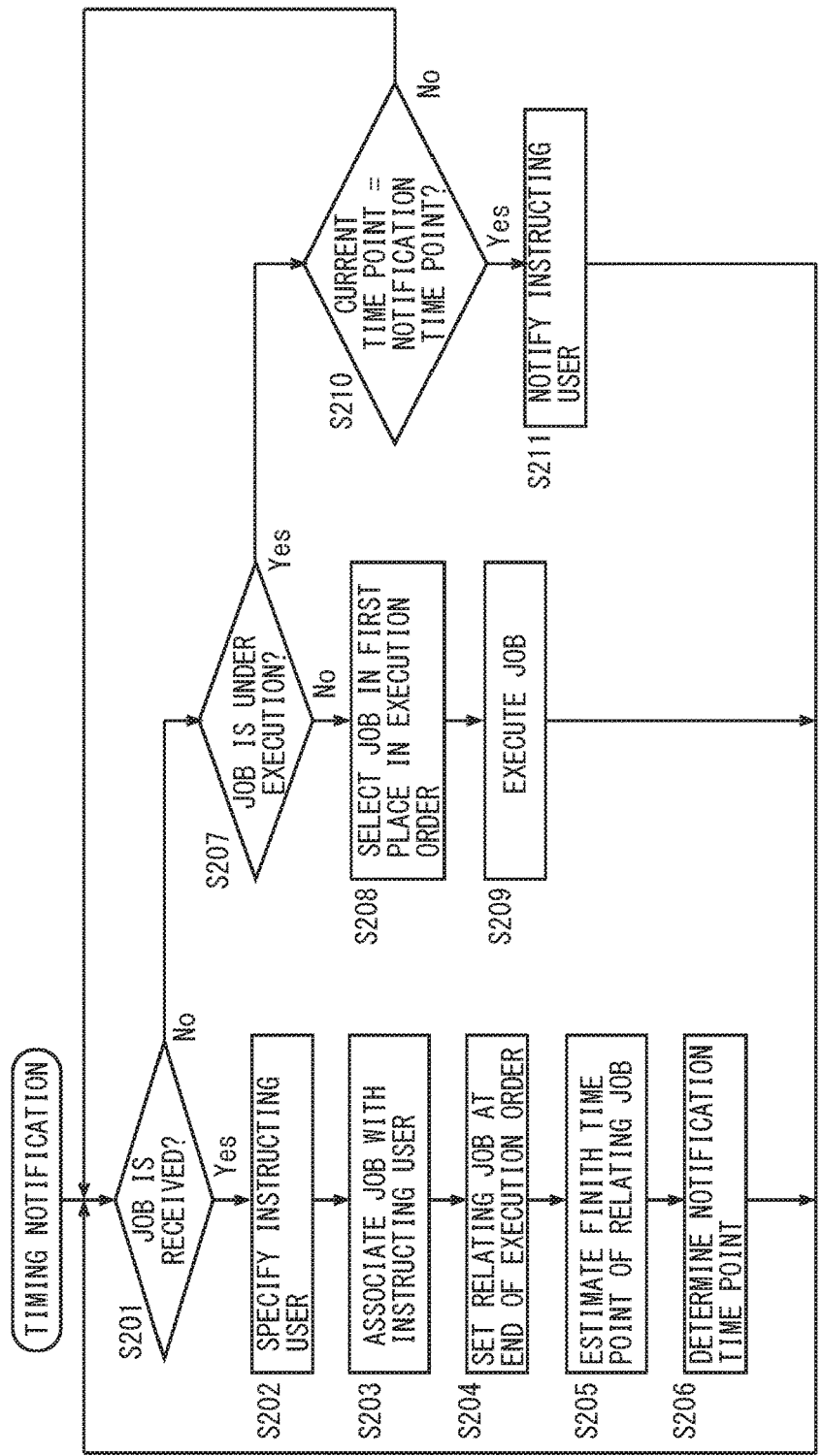
F I G. 15

# IMAGE FORMING APPARATUS AND NON-TRANSITORY COMPUTER-READABLE RECORDING MEDIUM ENCODED WITH JOB EXECUTION CONTROL PROGRAM

This application is based on Japanese Patent Application No. 2016-125229 filed with Japan Patent Office on Jun. 24, 2016, the entire content of which is hereby incorporated by reference.

BACKGROUND OF THE INVENTION

Field of the Invention

The present invention relates to an image forming apparatus and a non-transitory computer-readable recording medium encoded with a job execution control program. In particular, the present invention relates to an image forming apparatus capable of measuring biometric information of a user and a non-transitory computer-readable recording medium encoded with a job execution program executed in the image forming apparatus.

Description of the Related Art

An image forming apparatus that is represented by a Multiple Function Peripheral (hereinafter referred to as an "MFP") is often provided in a workplace. This MFP can be used by a plurality of persons and receive a plurality of jobs. For example, Japanese Patent Laid-Open No. 9-55821 discloses an image processing apparatus that executes a plurality of jobs, including a job interruption means that interrupts a job under execution with a different job, and a job execution means that, after a process of interrupting a job by the interruption means is finished, executes a job that does not require instruction of an operator while giving priority to the job.

On the other hand, a cardiac potential measurement device that measures a cardiac potential of a user in order to check a health state of the user in a working environment has been known. Because it requires a predetermined time period for measurement of the cardiac potential by the cardiac potential measurement device, if the biometric information is measured by the cardiac potential measurement device during a waiting time period during which the MFP executes a job, the user can make an efficient use of the time.

However, in the case where a plurality of jobs are input in the MFP, because the MFP executes the plurality of jobs in order of the input, the user sometimes cannot be informed of a time point at which the job that is input by the user himself/herself finishes. Further, the user cannot be informed of a time period from the time when the measurement starts in the cardiac potential measurement device until the time when the measurement is completed. Therefore, there sometimes is a time difference between a time period during which the job is executed in the MFP and a time period during which the cardiac potential measurement device measures the cardiac potential. Thus, there is a problem that it is difficult for the user to make an efficient use of time.

SUMMARY OF THE INVENTION

According to one aspect of the present invention, an image forming apparatus includes a measurer that measures biometric information of a user, an analyzer that analyzes the measured biometric information, a job accepter that accepts jobs, a job executer that executes the jobs accepted by the job accepter, and a hardware processor configured to estimate a job execution time period during which the job executor executes each of at least one of a plurality of jobs accepted by the job acceptor, estimate a finish time point at which the analyzer finishes the analysis, and in response to start of measurement of the biometric information by the measurer, change execution order of a relating job, which relates to the user who is a subject of the measurement by the measurer, among the plurality of jobs such that a period during which the relating job is executed and the finish time point have a predetermined relationship.

According to another aspect of the present invention, an image forming apparatus includes a measurer that measures biometric information of a user, an analyzer that analyzes the measured biometric information, a job accepter that accepts jobs, a job executer that executes jobs accepted by the job accepter, and the hardware processor configured to estimate a completion time point at which execution of the accepted job by the job executer is completed, estimate a measurement time period from a time when the measurer starts measurement until a time when the analyzer finishes analysis, and notify the user who has given instruction to execute the accepted job of a time point that precedes the estimated completion time point by the measurement time period.

According to yet another aspect of the present invention, a non-transitory computer-readable recording medium is encoded with a job execution control program that is executed by a computer controlling an image forming apparatus, the job execution control program causing the computer to execute a measurement step of measuring biometric information of a user, an analysis step of analyzing the measured biometric information, a job acceptance step of accepting jobs, a job execution step of executing the jobs in order of acceptance in the job acceptance step, an execution time period estimation step of estimating a job execution time period during which at least each of one of a plurality of jobs accepted in the job acceptance step is executed in the job execution step, a finish time point estimation step of estimating a finish time point at which the analysis finishes in the analysis step, and a changing step of, in response to start of measurement of the biometric information in the measurement step, changing execution order of a relating job that relates to the user who is a subject of the measurement in the measurement step among the plurality of jobs such that a period during which the relating job is executed and the finish time point have a predetermined relationship.

According to yet another aspect of the present invention, a non-transitory computer-readable recording medium is encoded with a job execution control program that is executed by a computer controlling an image forming apparatus, the job execution control program causing the computer to execute a measurement step of measuring biometric information of a user, an analysis step of analyzing the measured biometric information, a job acceptance step of accepting jobs, a job execution step of executing jobs in order of acceptance in the job acceptance step, a completion time point estimation step of estimating a completion time point at which execution of the accepted job is completed in the job execution step, a measurement time period estimation step of estimating a measurement time period from a time when measurement starts in the measurement step until a time when the analysis finishes in the analysis step, and a timing notification step of notifying the user who has given instruction to execute the accepted job of a time point that precedes the estimated completion time point by the measurement time period.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 7 is a flow chart showing one example of a flow of an operation acceptance process;

FIG. 15 is a flow chart showing one example of a flow of a timing notification process.

DESCRIPTION OF THE PREFERRED EMBODIMENTS

Figure 1:
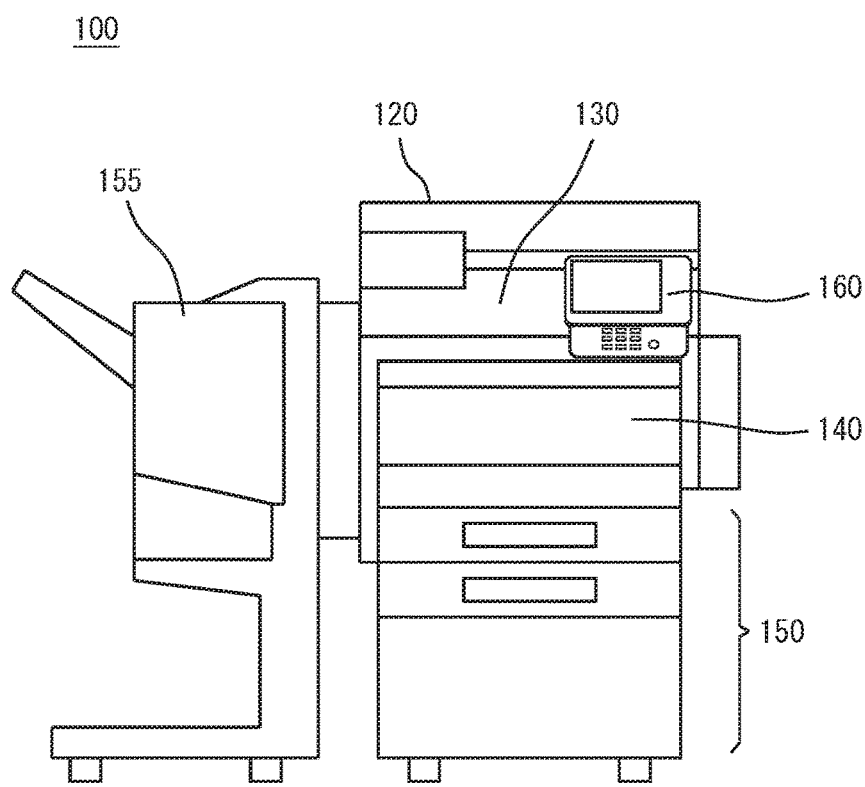
FIG. 1 is a perspective view showing the appearance of an MFP in one embodiment of the present embodiment.

Embodiments of the present invention will be described below with reference to the drawings. In the following description, the same parts are denoted with the same reference characters. Their names and functions are also the same. Thus, a detailed description thereof will not be repeated.

Figure 2:
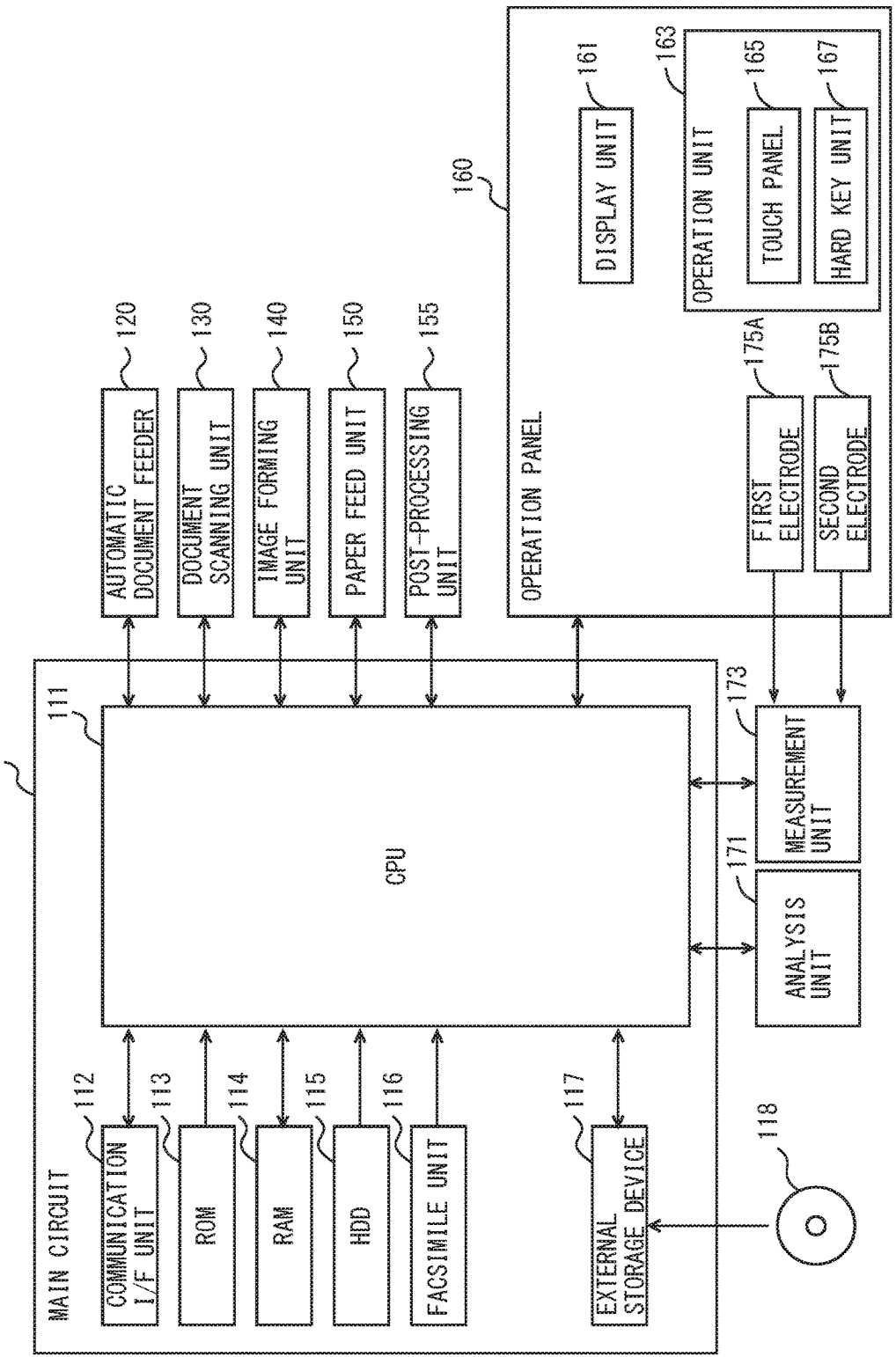
FIG. 2 is a block diagram showing an outline of a hardware configuration of the MFP in the one embodiment of the present embodiment.

FIG. 1 is a perspective view showing the appearance of an MFP in one embodiment of the present invention. FIG. 2 is a block diagram showing an outline of a hardware configuration of the MFP in the one embodiment of the present invention. Referring to FIGS. 1 and 2, the MFP 100 includes a main circuit 110, a document scanning unit 130 for scanning a document, an automatic document feeder 120 for conveying a document to the document scanning unit 130, an image forming unit 140, a paper feed unit 150 for supplying sheets of paper to the image forming unit 140, a post-processing unit 155 for processing sheets of paper on which images have been formed, an operation panel 160 serving as a user interface, an analysis unit 171 and a measurement unit 173.

The automatic document feeder 120 supplies a document placed on a document tray to the document scanning unit 130. In the case where a plurality of documents are placed on the document tray, the automatic document feeder 120 sequentially conveys the plurality of documents in a one-by-one manner to the document scanning unit 130.

The document scanning unit 130 includes an optoelectronic transducer such as a CCD (Charge Coupled Device), optically reads out the document conveyed from the automatic document feeder 120, and outputs an image as electronic data.

The image forming unit 140 is a laser printer and visualizes the image output by the image scanning unit 130 or an image stored in an HDD 115 by forming them on a recording medium such as a sheet of paper supplied from the paper feed unit 150. In the case of color printing, the image forming unit 140 forms an image using toner of four colors including yellow, magenta, cyan and black. The image forming unit 140 may be an inkjet printer.

The post-processing unit 155 performs a sorting process of sorting and discharging one or more sheets of paper on which images have been formed by the image forming unit 140, a hole-punching process of punching the sheets, and a stapling process of stapling the sheets.

The operation panel 160 includes a display unit 161, an operation unit 163, a first electrode 175A and a second electrode 175B.

The measurement unit 173 is connected to the first electrode 175A and the second electrode 175B. The measurement unit 173 is controlled by a CPU 111, detects an electrical potential of the first electrode 175A and an electrical potential of the second electrode 175B, and measures a difference between the detected electrical potentials as a cardiac potential. The measurement unit 173 outputs the measured cardiac potential to the CPU 111. During a period in which the electrical potential of the first electrode 175A and the electrical potential of the second electrode 175B are detected, the measurement unit 173 continuously measures the cardiac potential and outputs the cardiac potential to the CPU 111 at predetermined time intervals.

The analysis unit 171 is controlled by the CPU 111, analyzes the cardiac potential measured by the measurement unit 173, and generates a result of the analysis. The analysis unit 171 outputs the result of the analysis to the CPU 111. As for an analysis method of the cardiac potential, a well-known method can be used. For example, the analysis unit 171 analyzes the cardiac potential based on the cardiac potential measured within a predetermined time period. Further, the analysis unit 171 may analyze the cardiac potential by using information indicating physical characteristics of the user, such as a gender, age, a height and weight. Thus, the result of the analysis corresponding to the physical characteristics of the user can be generated.

The main circuit 110 includes the CPU 111, a communication interface (I/F) unit 112, a ROM 113, a RAM 114, the hard disc drive (HDD) 115 as a mass storage, a facsimile unit 116 and an external storage device 117 on which a CD-ROM 118 is mounted. The CPU 111 is connected to the automatic document feeder 120, the document scanning unit 130, the image forming unit 140, the paper feed unit 150, the post-processing unit 155, the operation panel 160, the analysis unit 171 and the measurement unit 173, and controls the entire MFP 100.

The ROM 113 stores a program executed by the CPU 111 or data necessary for execution of the program. The RAM 114 is used as a work area when the CPU 111 executes a program. Further, the RAM 114 temporarily stores scan data (image data) successively transmitted from the document scanning unit 130.

The communication I/F unit 112 is an interface for connecting the MFP 100 to a network. The CPU 111 communicates with a computer connected to the network via the communication I/F unit 112 for transmitting and receiving data. Further, the communication I/F unit 112 can communicate with a computer connected to the Internet via the network.

The facsimile unit 116 is connected to the public switched telephone networks (PSTN) and transmits facsimile data to or receives facsimile data from the PSTN. The facsimile unit 116 stores the received facsimile data in the HDD 115 or outputs the data to the image forming unit 140. The image forming unit 140 prints the facsimile data received by the facsimile unit 116 on a sheet of paper. Further, the facsimile unit 116 converts the data stored in the HDD 115 into facsimile data, and transmits the facsimile data to a facsimile machine connected to the PSTN.

The external storage device 117 is mounted with the CD-ROM (Compact Disk ROM) 118. The CPU 111 can access the CD-ROM 118 via the external storage device 117. The CPU 111 loads a program, recorded in the CD-ROM 118 which is mounted on the external storage device 117, into the RAM 114 for execution. It is noted that the medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, and a semiconductor memory such as a mask ROM, an EPROM (Erasable Programmable ROM) and an EEPROM (Electrically EPROM).

Further, the program executed by the CPU 111 is not restricted to the program recorded in the CD-ROM 118, and CPU 111 may load a program, stored in the HDD 115, into the RAM 114 for execution. In this case, another computer connected to the network via the communication I/F unit 112 may rewrite the program stored in the HDD 115 of the MFP 100, or may additionally write a new program therein. Further, the MFP 100 may download a program from another computer connected to the network via the communication I/F unit 112, and store the program in the HDD 115. The program referred to here includes not only a program directly executable by the CPU 111 but also a source program, a compressed program, an encrypted program or the like.

Figure 3:
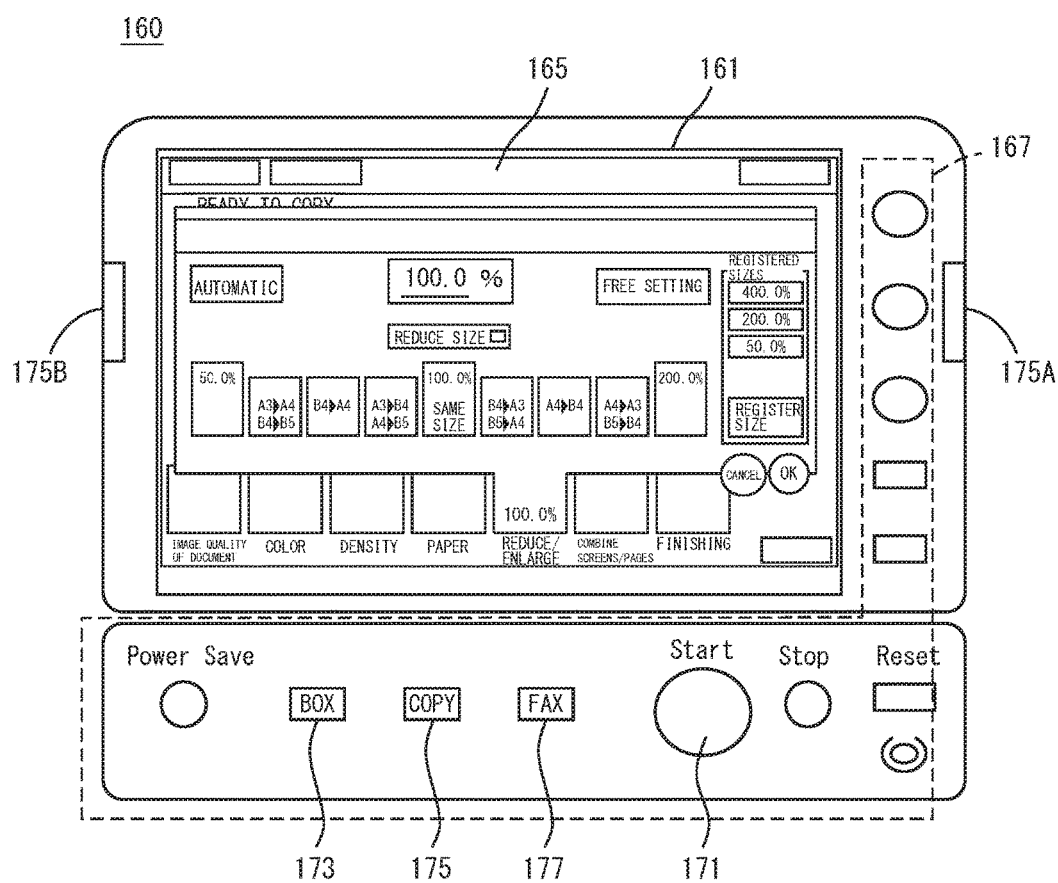
FIG. 3 is a plan view showing one example of an operation panel.

The operation panel 160 is provided on an upper surface of the MFP 100. FIG. 3 is a plan view showing one example of the operation panel. The dotted line in FIG. 3 is added for convenience to indicate a region where the hard key unit 167 is arranged in the operation panel 160, and does not actually exist. Referring to FIG. 3, the operation panel 160 includes the display unit 161, the operation unit 163, and the first electrode 175A and the second electrode 175B respectively arranged in the vicinity of left and right portions of the display unit 161. The display unit 161 is a Liquid Crystal Display (LCD), for example, and displays instruction menus to users, information about the acquired image data, and the like.

The operation unit 163 includes a touch panel 165 and the hard key unit 167. The touch panel 165 is made from a transparent member and provided on an upper surface or a lower surface of the display unit 161 in a superimposed manner. The hard key unit 167 includes a plurality of hard keys. The hard keys are contact switches, for example. The touch panel 165 detects a position designated by the user in the display surface of the display unit 161. Because the user is likely to be in an upright attitude when operating the MFP 100, a display surface of the display unit 161, an operation surface of the touch panel 165 and the hard key unit 167 are arranged to face upward. This is for the purpose of enabling the user to easily view the display surface of the display unit 161 and easily give instruction on the operation unit 163 with his or her finger. When fingers of the user respectively come into contact with the first electrode 175A and the second electrode 175B, each of the first electrode 175A and the second electrode 175B detects an electrical potential of the finger of the user as biometric information and outputs the detected electrical potential to the measurement unit 173.

Figure 4:
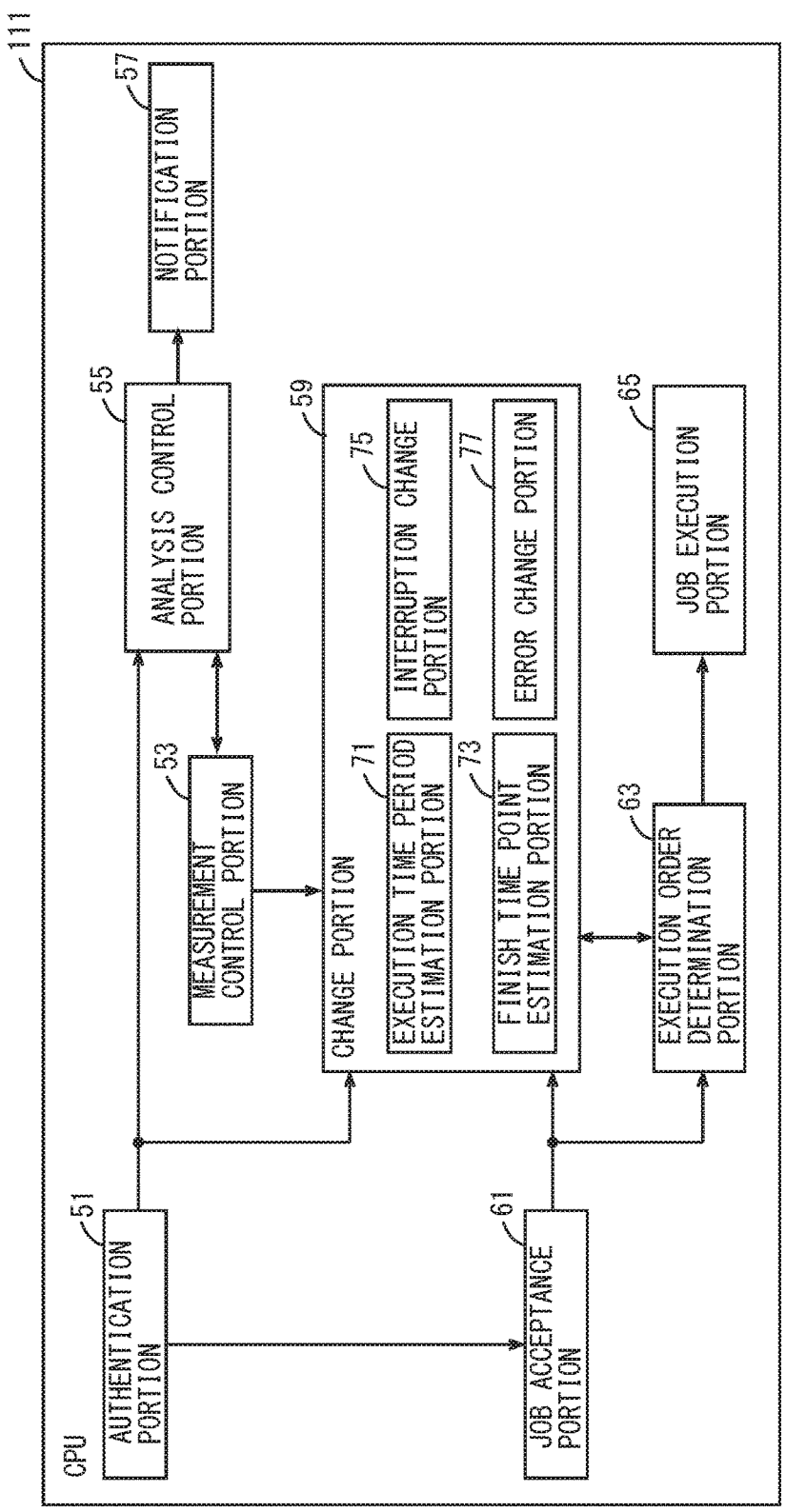
FIG. 4 is a block diagram showing one example of functions of a CPU included in the MFP in the first embodiment.

FIG. 4 is a block diagram showing one example of functions of the CPU included in the MFP in the first embodiment. The functions shown in FIG. 4 are formed in the CPU 111 in the case where the CPU 111 included in the MFP 100 executes a job execution program stored in the ROM 113, the HDD 115 or the CD-ROM 118. Referring to FIG. 4, the CPU 111 includes an authentication portion 51 that authenticates the user, a measurement control portion 53 that controls the measurement unit 173, an analysis control portion 55 that controls the analysis unit 171, a notification portion 57 that notifies the user of a result of the analysis, a job acceptance portion 61 that accepts jobs, an execution order determination portion 63 that determines the execution order of the jobs, a change portion 59 that changes the execution order of the jobs, and a job execution portion 65 that executes the jobs in order.

The authentication portion 51 performs authentication of the user who operates the operation panel 160. The authentication portion 51 accepts the authentication information input by the user. If the accepted authentication information is stored in advance, the authentication portion 51 authenticates and specifies the user. The authentication portion 51 outputs user identification information for identifying the authenticated user to the analysis control portion 55, the change portion 59 and the job acceptance portion 61. For example, in the case where a set of a user ID and a password is used as the authentication information, a log-in screen is displayed in the display unit 161. The authentication portion 51 accepts the authentication information, which the user inputs in the operation unit 163 in accordance with the log-in screen. Further, in the case where a finger print of the user is used as the authentication information, a finger print reader is provided in the operation panel 160. If the finger print read by the finger print reader is registered in advance, the authentication portion 51 authenticates the user specified by the finger print. Further, in the case where a vein pattern of the user is used as the authentication information, a vein pattern reader is provided in the operation panel 160. If the vein pattern read by the vein pattern reader is registered in advance, the authentication portion 51 authenticates the user specified by the vein pattern. Further, in the case where iris of the user is used as the authentication information, an iris reader is provided in the operation panel 160. If the iris read by the iris reader is registered in advance, the authentication portion 51 authenticates the user specified by the iris.

Further, a magnetic card or an IC card that stores card identification information assigned to the user may be used as the authentication information. In this case, a card reader is provided in the operation panel 160. If the card identification information read by the card reader is registered, the authentication portion 51 authenticates the user to whom the card identification information is assigned. Further, the device identification information of a portable information device assigned to the user may be used as the authentication information. In this case, a short-range communication device capable of wirelessly communicating within a predetermined range is included in the MFP 100. If the device identification information received from the portable information device with which the short-range communication device become communicable is registered in advance, the authentication portion 51 authenticates the user to whom the portable information device specified by the device identification information is assigned. For example, the short-range communication may be based on the NFC (Near Field Communication) standard or may be based on Bluetooth (trademark) standard.

The authentication information, which is used for authentication, such as a set of a user ID and a password, biometric information including a finger print, a vein pattern, iris or the like, card identification or the like may be stored in the HDD 115 for each user, or may be stored in an external device such as a server connected to the MFP 100 via the network. In the case where the authentication information is stored in the external device, the authentication portion 51 may request the external device to execute an authentication process, and may receive a result of the authentication process executed by the external device from the external device.

The measurement control portion 53 controls the measurement unit 173 and acquires a cardiac potential output by the measurement unit 173. When the measurement control portion 53 outputs a measurement instruction to the measurement unit 173, the measurement unit 173 outputs a cardiac potential that is measured after receiving the measurement instruction. In the case where an electrical potential is detected in each of the first electrode 175A and the second electrode 175B, the measurement unit 173 measures and outputs a cardiac potential. A state where the user is in contact with the first electrode 175A and the second electrode 175B, and the measurement unit 173 is measuring a cardiac potential is referred to as a measurement state. Thus, in the case where outputting the measurement instruction to the measurement unit 173 and then receiving the cardiac potential from the measurement unit 173, the measurement control portion 53 detects the measurement state. In response to detection of the measurement state, the measurement control portion 53 outputs a measurement start signal to the change portion 59 and the analysis control portion 55. The measurement control portion 53 continuously outputs the cardiac potential acquired from the measurement unit 173 after detecting the measurement state to the analysis control portion 55.

In the case where an electrical potential is detected in each of the first electrode 175A and the second electrode 175B, the measurement unit 173 may measure and output a cardiac potential regardless of input of measurement instruction. In this case, the measurement control portion 53 does not output a measurement instruction to the measurement unit 173, and the measurement control portion 53 may detect the measurement state in response to reception of the cardiac potential from the measurement unit 173.

The analysis control portion 55 receives the user identification information from the authentication portion 51 and then acquires user information. The user information is the information that indicates physical characteristics of the user such as a gender, age, a height and weight. The analysis control portion 55 displays a setting screen for setting the user information in the display unit 161, and accepts the user information input in the operation unit 163 by the user. The analysis control portion 55 stores the accepted user information in the HDD 115 in association with the user identification information. In the case where the user information associated with the user identification information received from the authentication portion 51 is stored in the HDD 115, the analysis control portion 55 does not display the setting screen in the display unit 161 and reads out the user information associated with the user identification information from the HDD 115. The analysis control portion 55 outputs the acquired user information to the analysis unit 171.

After receiving the user identification information from the authentication portion 51 and receiving the measurement start signal from the measurement control portion 53, the analysis control portion 55 outputs the cardiac potential continuously received from the measurement control portion 53 to the analysis unit 171. The analysis unit 171 generates a result of the analysis corresponding to the user information based on the cardiac potential received from the analysis control portion 55. In response to the end of the analysis and the generation of the result of the analysis, the analysis unit 171 outputs the result of the analysis to the CPU 111. Therefore, in response to reception of the result of the analysis from the analysis unit 171, the analysis control portion 55 outputs a finish signal to the measurement control portion 53 and outputs the result of the analysis to the notification portion 57.

While the analysis control portion 55 analyzes a cardiac potential in the present embodiment as an example, the analysis control portion 55 may analyze a pulse, a heart rate, blood pressure or the like as long as it is biometric information, and may calculate a value indicating a state of a human body.

In the case where an electrical potential is no longer detected in at least one of the first electrode 175A and the second electrode 175B before the measurement control portion 53 receives a finish signal from the analysis control portion 55 since the measurement control portion 53 outputs a measurement start signal to the analysis control portion 55, the measurement control portion 53 outputs an interruption signal to the change portion 59.

In response to reception of the result of the analysis from the analysis control portion 55, the notification portion 57 notifies the user of the result of the analysis. Specifically, the notification portion 57 displays the result of the analysis in the display unit 161. Further, the notification portion 57 may control the image forming unit 140 and allow an image showing the result of the analysis to be formed on a sheet of paper. Further, the notification portion 57 may store a result of the analysis for each user in the HDD 115, and may make notification of the result of the analysis received from the analysis control portion 55 together with a result of the analysis of the past.

The job acceptance portion 61 accepts jobs. The job execution portion 65 executes the jobs accepted by the job acceptance portion 61. The job execution portion 65 can execute a plurality of types of jobs. The job, which the job execution portion 65 is capable of executing, defines one or more among a scan process of controlling the automatic document feeder 120 and the document scanning unit 130, and scanning a document and outputting image data, a facsimile transmission reception process of controlling the facsimile unit 116, and transmitting and receiving facsimile data, which is image data, a data transmission reception process of controlling the communication I/F unit 112, and transmitting and receiving the image data, and a process of controlling the image forming unit 140 and the paper feed unit 150 and forming an image of image data on a sheet of paper. For example, a copy job that defines the scan process and the image forming process defines a process of forming an image of the image data, which has been scanned and acquired, on a sheet of paper. Further, a print job that defines the data transmission reception process and the image forming process defines a process of forming an image of the image data, which the communication I/F unit 112 has externally received, on a sheet of paper.

In the case where the user operates the operation unit 163 and inputs a job, the job acceptance portion 61 accepts the job accepted by the operation unit 163. The job acceptance portion 61 receives the user identification information of the user who operates the operation unit 163 from the authentication portion 51. In the case where the job is accepted by the operation unit 163, the job acceptance portion 61 outputs a set of the accepted job and the user identification information received from the authentication portion 51 to the change portion 59 and the execution order determination portion 63.

In the case where the communication I/F unit 112 receives a print job from an external device, the job acceptance portion 61 specifies the device that has transmitted the print job, and acquires user identification information of a user who has given instruction to execute the print job from the device. The job acceptance portion 61 outputs a set of the received print job and the acquired user identification information to the change portion 59 and the execution order determination portion 63. The user identification information is sometimes included in the print job. In that case, the job acceptance portion 61 specifies a user who has given instruction to execute a print job from the user identification information included in the print job.

The execution order determination portion 63 receives jobs from the job acceptance portion 61 and determines the execution order of the input jobs. In a default setting, the execution order determination portion 63 determines the order in which the jobs are accepted by the job acceptance portion 61 as the order in which the jobs are executed. The execution order determination portion 63 outputs a set of job identification information for identifying the jobs and the execution order to the change portion 59.

The change portion 59 changes the execution order of the jobs input by the user who operates the operation unit 163 such that a time period during which a job is executed and a time point at which a result of the analysis is generated by the analysis control portion 55 have a predetermined relationship. Hereinafter, the job input by the user who operates the operation unit 163 is referred to as a relating job. In the case where changing the execution order received from the execution order determination portion 63, the change portion 59 outputs the changed execution order to the execution order determination portion 63.

In the case where the execution order is not changed by the change portion 59, the execution order determination portion 63 sequentially outputs the jobs to the job execution portion 65 in accordance with the order in which the jobs are accepted by the job acceptance portion 61. In the case where the execution order is changed by the change portion 59, the execution order determination portion 63 sequentially outputs the jobs to the job execution portion 65 in accordance with the changed execution order.

The change portion 59 receives the user identification information of the user who operates the operation unit 163 from the authentication portion 51, receives a set of the job and the user identification information from the job acceptance portion 61, and receives a set of the job identification information and the execution order from the execution order determination portion 63. Further, the change portion 59 receives the measurement start signal from the measurement control portion 53, and sometimes receives an interruption signal after receiving the measurement start signal.

The change portion 59 includes an execution time period estimation portion 71, a finish time point estimation portion 73, an interruption change portion 75 and an error change portion 77. The execution time period estimation portion 71 estimates an execution time period required for the job execution portion 65 to execute a job received from the job acceptance portion 61. In the case where receiving a plurality of jobs from the job acceptance portion 61, the execution time period estimation portion 71 estimates an execution time period for each of the plurality of jobs. As for the job that is under execution by the job execution portion 65, the execution time period estimation portion 71 estimates a remaining time period until the job execution portion 65 finishes executing the job under execution as an execution time period of the job under execution. For example, as for the job under execution by the job execution portion 65, the execution time period estimation portion 71 estimates a time period required for the job execution portion 65 to execute the job under execution from the beginning. Then, the execution time period estimation portion 71 subtracts a time period during which the job execution portion 65 has been executing the job under execution from the estimated time period, and thus estimating the execution time period.

The finish time point estimation portion 73 estimates a time point at which a user is notified of a result of the analysis of a cardiac potential of the user who operates the operation unit 163 and determines the estimated time point as a measurement finish time point. The finish time point estimation portion 73 determines a time period from the time when the analysis unit 171 starts the analysis until the time when the analysis unit 171 finishes the analysis as a measurement time period, and determines a time point at which the measurement time period has elapsed since a time point at which a measurement start signal is received from the measurement control portion 53 as a measurement finish time point. A default value of the measurement time period may be defined. Alternatively, in the case where the measurement time period varies depending on user information, the measurement time period may be defined for each piece of the user information. Further, history information that associates a time period from the time when the measurement start signal is received until the time when the analysis finishes with the user identification information received from the authentication portion 51 may be stored in the HDD 115, and the analysis control portion 55 may determine the measurement time period based on the stored history information. Specifically, the finish time point estimation portion 73 determines an average value or a maximum value of the measurement time periods in the history information associated with the user identification information received from the authentication portion 51 among the history information stored in the HDD 115 as the measurement time period.

<First Changing Method>

The change portion 59 changes execution order of a relating job such that a time point at which execution of the relating job finishes is earlier than a measurement finish time point and is the closest to the measurement finish time point. In the case where a job finish time point at which execution of a post-job that comes immediately after the relating job in the execution order finishes is earlier than the measurement finish time point, the change portion 59 changes the execution order of the relating job such that the relating job comes after a post-job in the execution order until a job finish time point is later than the measurement finish time point. Specifically, the change portion 59 specifies a post-job that comes immediately after the relating job in the execution order based on the execution order of the relating job, and estimates a time point at which a total time period, of respective execution time periods of a post-job and jobs that come earlier in the execution order than the post-job, has elapsed since a time point at which a measurement start signal is received from the measurement control portion 53 as a job finish time point at which execution of the post-job finishes. If the estimated job finish time point is earlier than the measurement finish time point, the change portion 59 changes the execution order of the relating job such that the relating job comes after a post-job in the execution order. In the case where the job finish time point at which execution of the post-job that comes immediately after the relating job in the changed execution order finishes is earlier than the measurement finish time point, the change portion 59 changes the execution order of the relating job such that the relating job comes after the post-job in the execution order.

In the case where a job finish time point at which the execution of the relating job finishes is later than the measurement finish time point, the change portion 59 changes the execution order of the relating job such that the relating job comes before a pre-job, which comes immediately before the relating job in the execution order, until a job finish time point at which the execution of the relating job finishes is earlier than the measurement finish time point. Specifically, the change portion 59 estimates a time point at which a total time period, of respective execution time periods of the relating job and jobs that come earlier in the execution order than the relating job, has elapsed since a time point at which a measurement start signal is received from the measurement control portion 53 as a job finish time point at which the execution of the relating job finishes. If the estimated job finish time point is later than the measurement finish time point, the change portion 59 changes the execution order of the relating job such that the relating job comes before the pre-job that comes immediately before the relating job in the execution order. In the case where, after the execution order is changed, a job finish time point at which the execution of the relating job finishes is later than the measurement finish time point, the change portion 59 changes the execution order of the relating job such that the relating job comes before a pre-job in the execution order.

Thus, the time point at which the execution of the relating job finishes can be earlier than the measurement finish time point and close to the measurement finish time point. Therefore, the execution of the relating job has finished at a time point at which the user can view the result of the analysis, so that the user can move away from the MFP 100 immediately after viewing the result of the analysis. Further, because the relating job finishes as close to the measurement finish time point as possible, the number of jobs, which have been input earlier than the relating job and are delayed because of the execution of the relating job, can be minimized.

<Second Changing Method>

The change portion 59 changes execution order of a relating job such that a job start time point at which the execution of the relating job starts is earlier than a measurement finish time point, and changes the execution order of the relating job such that a job finish time point at which the execution of the relating job finishes is later than the measurement finish time point. After the execution order of the relating job is changed by the first changing method, a time point at which execution of a post-job, which comes immediately after the relating job in the execution order, finishes is later than the finish time point. In this state, in the case where, after the execution order of the relating job is changed such that the relating job comes after the post-job in the execution order, a job start time point at which the execution of the relating job starts is earlier than the measurement finish time point, the change portion 59 changes the execution order of the relating job such that the relating job comes after a post-job in the execution order. Thus, a job start time point at which the execution of the relating job starts is earlier than the measurement finish time point, and a job finish time point at which the execution of the relating job finishes is later than the measurement finish time point. Thus, the job finish time point can sometimes be close to the measurement finish time point. Therefore, the relating job is under execution at a time point at which the user can view the result of the analysis, so that the user can view the result of the analysis until the execution of the relating job finishes.

<Third Changing Method>

The change portion 59 changes execution order of a relating job such that a job start time point at which the execution of the relating job starts is later than a measurement finish time point and closest to the measurement finish time point. In the case where a job start time point at which the execution of the relating job starts is earlier than the measurement finish time point, the change portion 59 changes the execution order of the relating job such that the relating job comes immediately after a post-job in the execution order until the job start time point is later than the measurement finish time point. Specifically, the change portion 59 specifies a pre-job that comes immediately before the relating job in the execution order based on the execution order of the relating job, and estimates a time point at which a total execution time period, of respective execution time periods of jobs that come earlier in the execution order than the pre-job, has elapsed since a time point at which a measurement start signal is received from the measurement control portion 53 as a job start time point at which the execution of the relating job starts. If the estimated job start time point is earlier than the measurement finish time point, the change portion 59 changes the execution order of the relating job such that the relating job comes after a post-job in the execution order. In the case where, after the execution order is changed, a job start time point at which the execution of the relating job starts is earlier than the measurement finish time point, the change portion 59 changes the execution order of the relating job such that the relating job comes after a post-job in the execution order.

In the case where the job start time point at which the execution of the relating job starts is later than the measurement finish time point, the change portion 59 changes the execution order of the relating job such that the relating job comes immediately before the pre-job, which comes immediately before the relating job in the execution order, until a job start time point at which execution of a pre-job, which comes immediately before the relating job in the execution order, starts is earlier than the measurement finish time point. Specifically, the change portion 59 estimates a time point at which a total execution time period of respective execution time periods of jobs that come earlier than the pre-job in the execution order has elapsed since a time point at which a measurement start signal is received from the measurement control portion 53 as a job start time point at which execution of a pre-job starts. If the estimated job start time point of the pre-job is later than the measurement finish time point, the change portion 59 changes the execution order of the relating job such that the relating job comes before the pre-job. In the case where, after the execution order is changed, a job start time point at which execution of a pre-job starts is later than the measurement finish time point, the change portion 59 changes the execution order of the relating job such that the relating job comes before the pre-job in the execution order.

Therefore, the relating job is not executed at a time point at which the user can view the result of the analysis. However, the relating job is executed next after the job that is under execution at the time point at which the user can view the result of the analysis. Therefore, the user can view the result of the analysis until the execution of the relating job finishes. In this case, it is preferable that the user is notified of a remaining time period until the relating job is executed by the display in the display unit 161 in addition to the result of the analysis or the like.

<Fourth Changing Method>

The change portion 59 changes execution order of a relating job such that a time point at which the execution of the relating job finishes is the closest to a finish time point. For example, a first time point at which the execution of the relating job finishes in the case where the relating job is executed in the execution order determined by the first changing method, a second time point at which the execution of the relating job finishes in the case where the relating job is executed in the execution order determined by the second changing method, and a third time point at which the execution of the relating job finishes in the case where the relating job is executed in the execution order determined by the third changing method are found. Then, the execution order of the relating job is changed to the execution order that is determined by the changing method corresponding to a time point closest to the measurement finish time point among the first time point, the second time point and the third time point.

In response to reception of an interruption signal from the measurement control portion 53 after a measurement start signal is received from the measurement control portion 53, the interruption change portion 75 changes the execution order of the relating job such that the relating job is executed next after the job under execution by the job execution portion 65. Thus, the case where the interruption signal is received from the measurement control portion 53 is the case where the user lifts a finger off at least one of the first electrode 175A and the second electrode 175B, and the case where the user has interrupted the measurement of the cardiac potential. In this case, the relating job is executed next after the job under execution, so that the relating job can be executed as early as possible, and a waiting time period for the user can be reduced.

In the case where an error occurs during the execution of the relating job by the job execution portion 65, the error change portion 77 changes the execution order of the relating job such that the relating job is executed later than the finish time point. Therefore, the user can operate the MFP and allow the MFP to recover from the error after viewing the result of the analysis. Further, because another job is executed during the measurement of the cardiac potential, an operation rate of the MFP 100 is improved.

Figure 5:
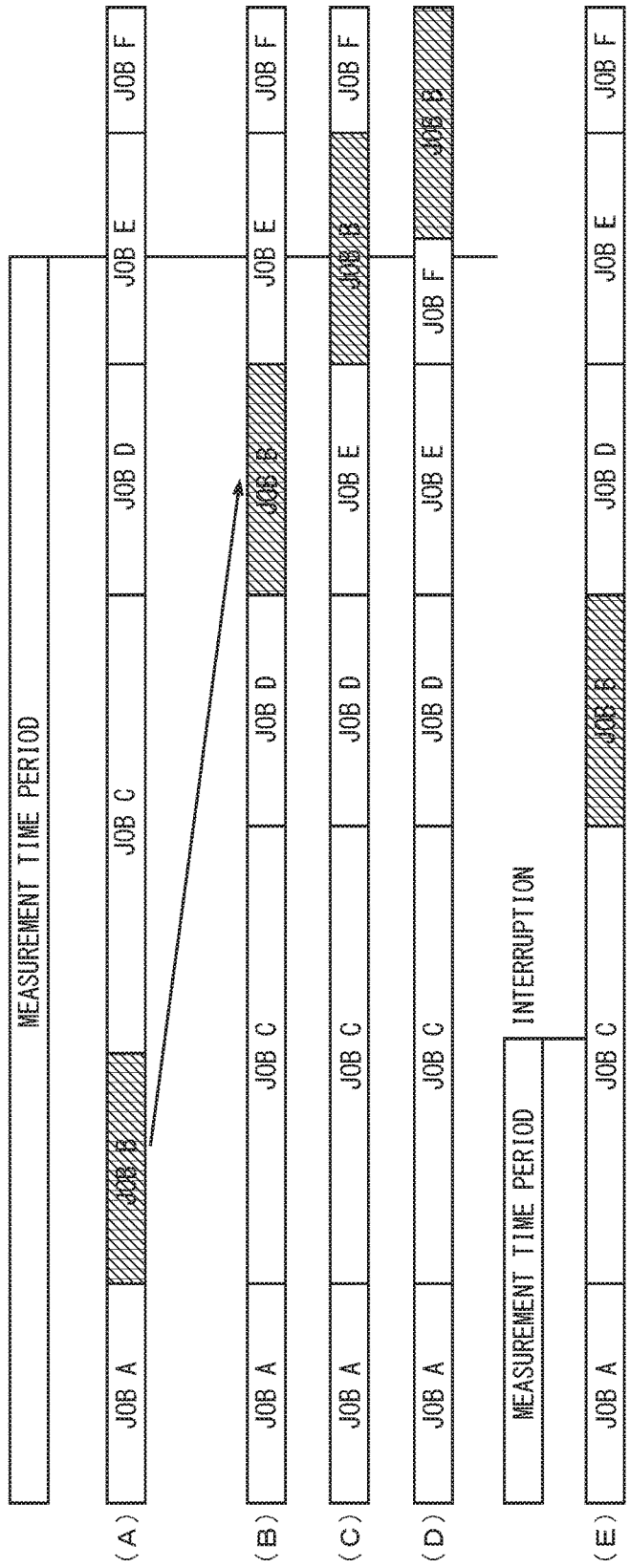
FIG. 5 is a first diagram showing one example of the change of execution order of jobs.

FIG. 5 is a first diagram showing one example of the change of the execution order of jobs. Referring to FIG. 5, a transverse direction indicates a time axis. A state (A) indicates a state where jobs A to job F are temporally arranged before measurement of the cardiac potential starts. The job A is under execution, and the jobs B to F are set in a wait line. The job B to which hatching is applied is referred to as a relating job that relates to the user whose cardiac potential is measured.

A state (B) shows a state of the temporal arrangement of the jobs A to F after the execution order of the job B is changed by the first changing method. As compared to the state (A), the execution order of the job B is changed such that the job B comes later in the execution order than the jobs C and D. The execution of the job B is finished at a measurement finish time point at which the measurement time period finishes. Therefore, the user can be informed of the result of the execution of the job immediately after the measurement of the cardiac potential. Further, the execution of the jobs C and D finishes earlier than the execution of the jobs C and D in the state (A), a waiting time period for the job C and the job D is reduced.

A state (C) shows the temporal arrangement of the jobs A to F at a time point at which the execution order of the job B is changed by the second changing method. Because the job B is under execution at a measurement finish time point at which the measurement time period finishes, the user can be informed after the measurement of the cardiac potential that the job, input by himself or herself, is under execution. Further, a remaining time period until the execution of the job B finishes can be allocated to checking of the result of the analysis. The execution of the jobs C to E finishes earlier than the execution of the jobs C to E in the state (A), the waiting time period for the jobs C to E can be reduced.

The state (D) shows the temporal arrangement of the jobs A to F at a time point at which the execution order of the job B is changed by the third changing method. The execution of the job B starts later than the measurement finish time point at which the measurement time period finishes. The job B can sometimes be allowed to start during a time period in which the user checks the result of the analysis. Further, because the execution of the jobs C to F finishes earlier than the execution of the jobs C to F in the state (A), the waiting time period for the jobs C to F is reduced.

The state (E) shows the temporal arrangement of the jobs A to F at a time point at which the measurement of the cardiac potential is interrupted during the execution of the job C. In any one of the state (B), the state (C) and the state (D), the job C is under execution at a time point at which the measurement of the cardiac potential is interrupted. Therefore, the execution order of the job B is changed such that the job B comes later in the execution order than the job C. Thus, the job B is executed next after the job C under execution at the time point at which the user interrupts the measurement of the cardiac potential, so that the user can be informed of the result of the execution of the job C as early as possible since the measurement of the cardiac potential is interrupted.

Figure 6:
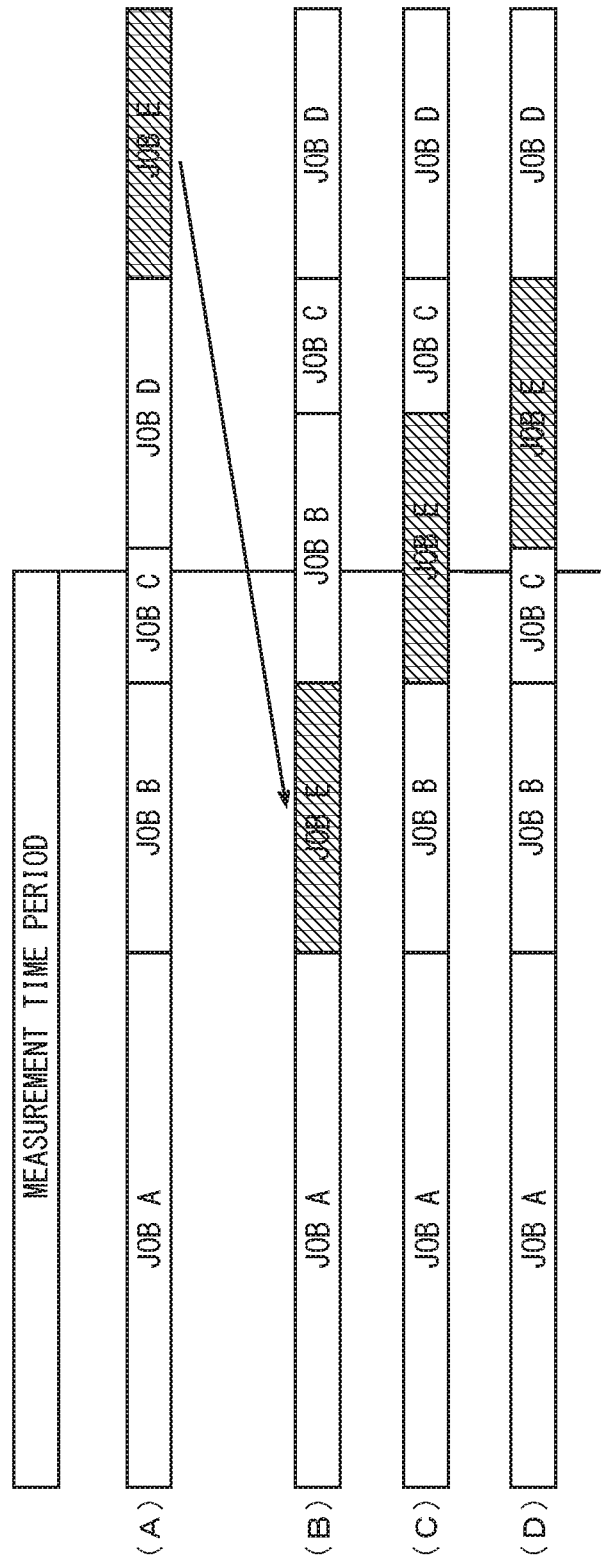
FIG. 6 is a second diagram showing one example of the change of the execution order of the jobs.

FIG. 6 is a second diagram showing one example of the change of the execution order of jobs. Referring to FIG. 6, a transverse direction indicates a time axis. The state (A) shows the temporal arrangement of the jobs A to E before measurement of a cardiac potential starts. The job A is under execution, and the jobs B to E are set in a wait line. The job E to which the hatching is applied is a relating job that relates to the user whose cardiac potential is measured.

The state (B) shows the temporal arrangement of the jobs A to E after the execution order of the job E is changed by the first changing method. As compared to the state (A), the execution order of the job E is changed such that the job E comes earlier in the execution order than the jobs B to D. The execution of the job E is finished at a measurement finish time point at which the measurement time period finishes, so that the user can be informed of the result of the execution of the job immediately after the measurement of the cardiac potential.

The state (C) shows the temporal arrangement of the jobs A to E at a time point at which the execution order of the job E is changed by the second changing method. The job E is under execution at the measurement finish time point at which the measurement time period finishes, so that the user can be informed after the measurement of the cardiac potential that the job, input by himself or herself, is under execution. Further, a remaining time period until the execution of the job E finishes can be allocated to checking of the result of the analysis.

The state (D) shows the temporal arrangement of the jobs A to E at a time point at which the execution order of the job E is changed by the third changing method. The execution of the job E starts later than the measurement finish time point at which the measurement time period finishes. The execution of the job B can sometimes be allowed to start during a time period in which the user checks the result of the analysis.

FIG. 7 is a flow chart showing one example of a flow of an operation acceptance process. The operation acceptance process is a process executed by the CPU 111 in the case where the CPU 111 included in the MFP 100 executes an operation acceptance program stored in the ROM 113, the HDD 115 or the CD-ROM 118. The operation acceptance program is part of a job execution control program. Referring to FIG. 7, the CPU 111 determines whether the user has logged in. If the authentication of the user who operates the operation unit 163 is successful, it is determined that the user has logged in. The process waits until the user logs in (NO in the step S01). If the user logs in (YES in the step S01), the process proceeds to the step S02.

In the step S02, the CPU 111 acquires user information of a logged-in user. The user information associated with user identification information of the user who is authenticated in the step S01 is acquired from the user information stored in the HDD 115 in advance. In the step S03, whether the user has logged out is determined. If the user authenticated in the step S01 logs out, the process ends. If not, the process proceeds to the step S04. For example, if a predetermined time period elapses without acceptance of an operation of the user by the operation unit 163 and detection of an electrical potential in any one of the first electrode 175A and the second electrode 175B, the CPU 111 determines that the user has logged out.

In the step S04, the CPU 111 determines whether a cardiac potential is detected. If an electrical potential is detected in each of the first electrode 175A and the second electrode 175B, the cardiac potential is detected. If the cardiac potential is detected, measurement of the cardiac potential starts, and the process proceeds to the step S05. If the cardiac potential is not detected, the process proceeds to the step S11.

In the step S11, the CPU 111 determines whether a job has been accepted. The job is accepted based on an operation of inputting in the operation unit 163 by the user. The operation of inputting in the operation unit 163 by the user includes an operation of setting a setting value for execution of a job and an operation of giving instruction to execute the job. If the job is accepted, the process proceeds to the step S12. If not, the process returns to the step S03. In the step S12, the CPU 111 associates the job accepted in the step S11 with the user who has logged in in the step S01, and the process proceeds to the step S13. In the step S13, the CPU 111 sets the execution order of the job accepted in the step S11 such that the accepted job is at the end of the wait line, and the process returns to the step S03.

In the step S05, the CPU 111 executes an execution order changing process, and the process proceeds to the step S06. While the details of the execution order changing process are described below, it is a process of changing the execution order of the relating job that relates to the logged-in user. The detection of the cardiac analysis is started in the step S04, and the analysis of the cardiac potential detected at predetermined time intervals is started in the step S06, and the process proceeds to the step S07. In the step S07, the CPU 111 determines whether the analysis of the cardiac potential has finished. If the analysis has finished, the process proceeds to the step S08. If not, the process proceeds to the step S09. In the step S08, the user is notified of the result of the analysis of the cardiac potential, and the process proceeds to the step S03.

In the step S09, the CPU 111 determines whether the measurement of the cardiac potential has been interrupted. If an electrical potential is no longer detected in any one of the first electrode 175A and the second electrode 175B, it is determined that the measurement is interrupted. If the measurement of the cardiac potential is interrupted, the process proceeds to the step S10. If not, the process returns to the step S07. In the step S10, the execution order of the relating job is changed such that the relating job is executed next after the job under execution, and the process returns to the step S03.

Figure 8:
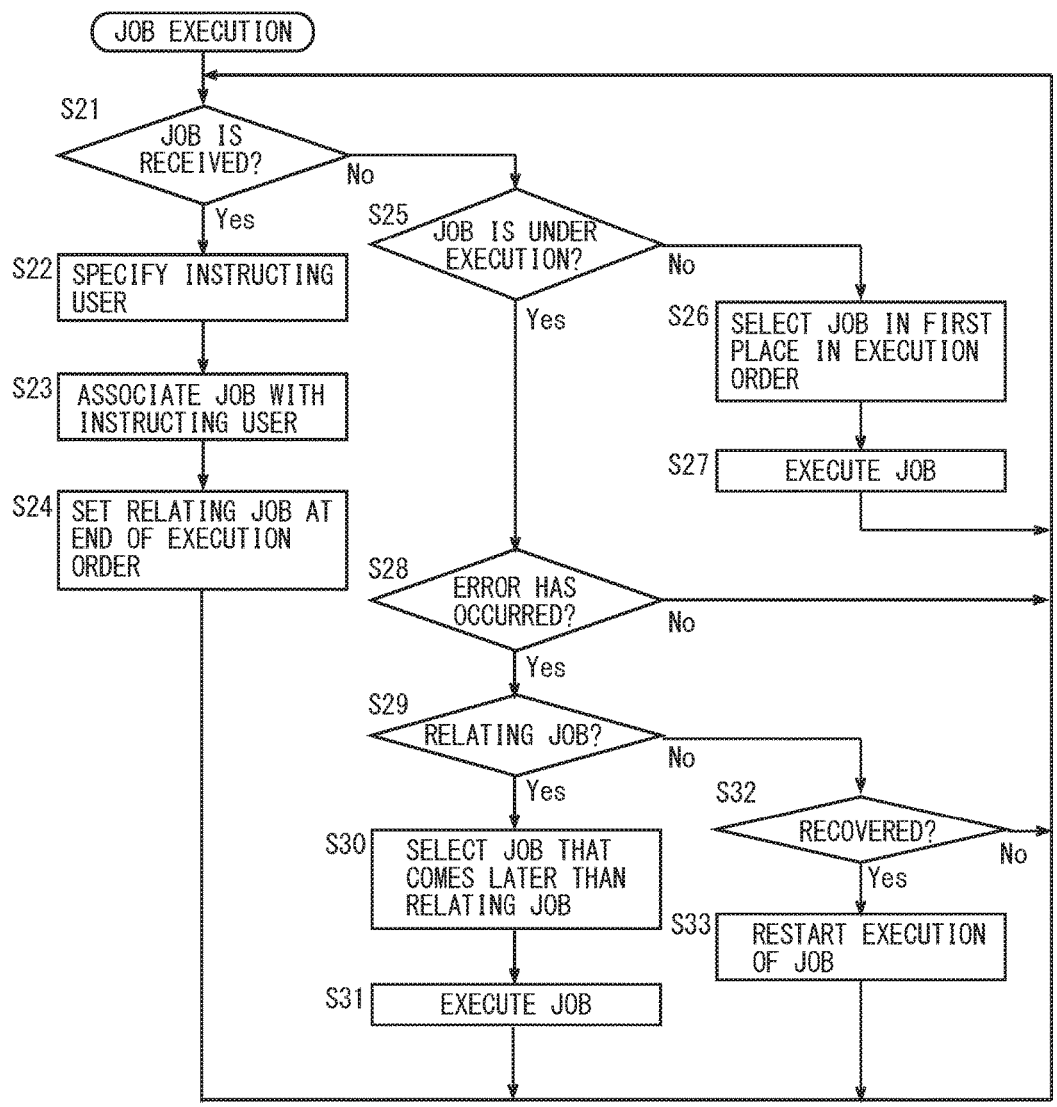
FIG. 8 is a flow chart showing one example of a flow of a job execution process.

FIG. 8 is a flow chart showing one example of a flow of a job execution process. The job execution process is a process executed by the CPU 111 in the case where the CPU 111 included in the MFP 100 executes a job execution program stored in the ROM 113, the HDD 115 or the CD-ROM 118. The job execution program is part of the job execution control program. Referring to FIG. 8, the CPU 111 determines whether the job has been received (step S21). If the communication I/F unit 112 receives a job, the process proceeds to the step S22. If not, the process proceeds to the step S25.

In the step S22, the CPU 111 specifies an instructing user who has given instruction to execute the received job, and the process proceeds to the step S23. For example, the CPU 111 specifies a user associated with a device that has transmitted the job as an instructing user. Further, the CPU 111 may make an inquiry to the device that has transmitted the job. Further, in the case where user identification information of an instructing user is included in the job, the CPU 111 acquires the user identification information. In the step S23, the CPU 111 associates the job received in the step S21 with the instructing user, and the process proceeds to the step S24. In the step S24, the execution order of the job accepted in the step S21 is set such that the accepted job is at the end of the wait line, and the process returns to the step S21.

In the step S25, the CPU 111 determines whether the job is under execution. If the job is under execution, the process proceeds to the step S28. If not, the process proceeds to the step S26. In the step S26, the CPU 111 selects a job that is in the first place in the execution order, and the process proceeds to the step S27. In the step S27, the CPU 111 starts to execute the job selected in the step S26, and the process returns to the step S21.

In the step S28, the CPU 111 determines whether an error has occurred. If an error has occurred, the process proceeds to the step S29. If not, the process returns to the step S21. In the step S29, the CPU 111 determines whether the job with the occurring error is the relating job. If it is the relating job, the process proceeds to the step S30. If not, the process proceeds to the step S32. In the step S30, the CPU 111 selects a job that comes later in the execution order than the relating job, and the process proceeds to the step S31. In the step S31, the CPU 111 starts to execute the job selected in the step S30, and the process returns to the step S21.

In the step S32, the CPU 111 determines whether the MFP has recovered from the error. If the MFP has recovered from the error, the process proceeds to the step S33. If not, the process returns to the step S21. In the step S33, the CPU 111 restarts the execution of the job, and the process returns to the step S21.

Figure 9:
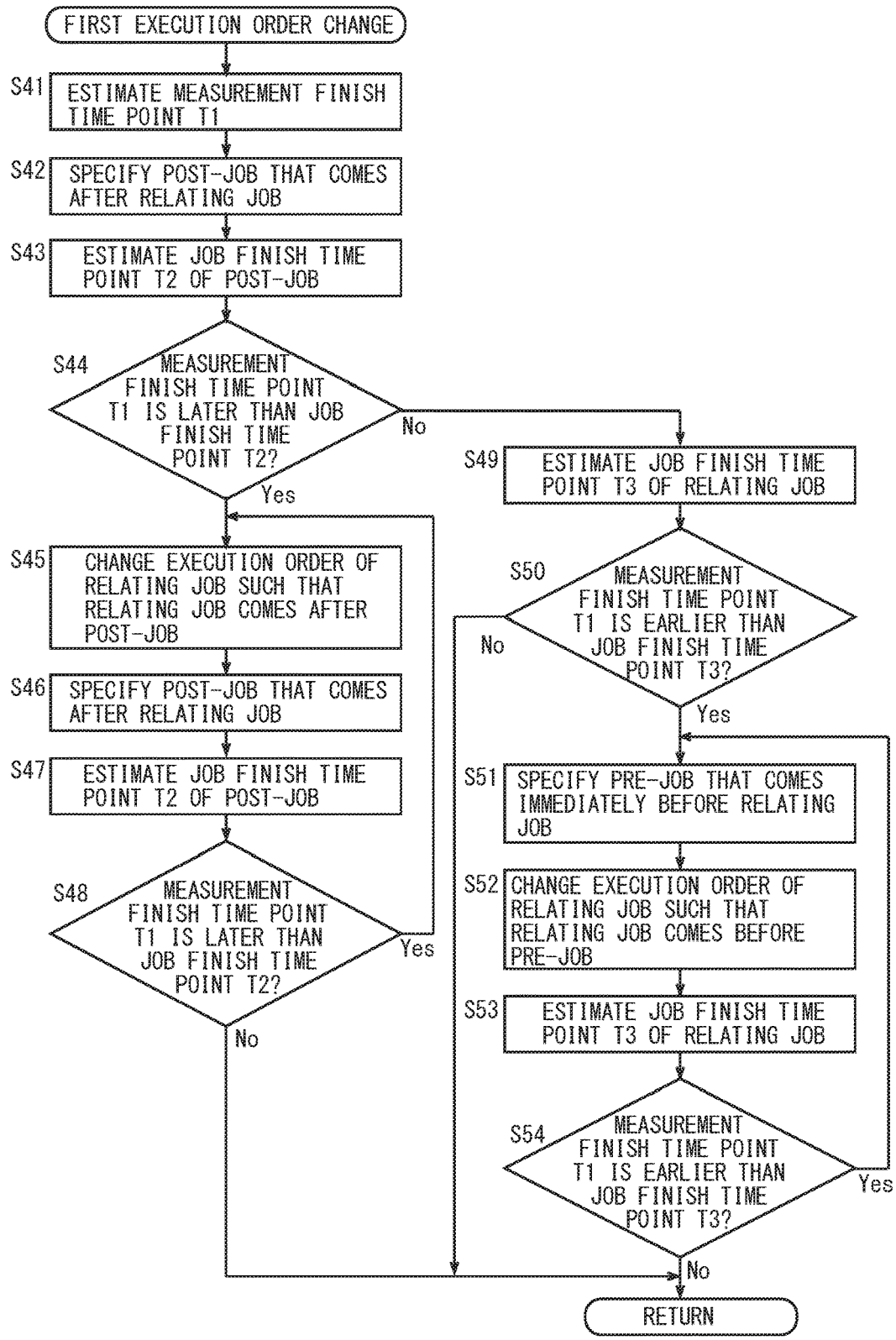
FIG. 9 is a flow chart showing one example of a flow of a first execution order changing process.

FIG. 9 is a flow chart showing one example of a flow of a first execution order changing process. The first execution order changing process is a process executed in the step S05 of the operation acceptance process shown in FIG. 7. Referring to FIG. 9, the CPU 111 estimates a measurement finish time point T1 (step S41). The measurement finish time point is a time point at which analysis of a cardiac potential of a user who operates the operation unit 163 finishes. For example, in the case where history information associated with the user who operates the operation unit 163 is stored in the HDD 115, the CPU 111 determines an average value or a maximum value of the measurement time periods in the history information, and a time point at which the determined measurement time period has elapsed since a current time point is taken as a measurement finish time point.

In the step S42, the CPU 111 specifies a post-job that comes immediately after the relating job in the execution order. Then, the CPU 111 estimates a job finish time point T2 of the post-job (step S43). In the next step S44, the CPU 111 determines whether the measurement finish time point T1 is later than the job finish time point T2 of the post-job. If the measurement finish time point T1 is later than the job finish time point T2 of the post-job, the process proceeds to the step S45. If not, the process proceeds to the step S49. In the step S45, the CPU 111 changes the execution order of the relating job such that the relating job comes later in the execution order than the post-job, and the process proceeds to the step S46.

In the step S46, the CPU 111 specifies a post-job that comes immediately after the relating job in the execution order. Then, the CPU 111 estimates a job finish time point T2 of the post-job (step S47). In the next step S48, the CPU 111 determines whether the measurement finish time point T1 is later than the job finish time point T2 of the post-job. If the measurement finish time point T1 is later than the job finish time point T2 of the post-job, the process returns to the operation acceptance process. If not, the process returns to the step S45.

In the step S49, the CPU 111 estimates a job finish time point T3 of the relating job. In the next step S50, the CPU 111 determines whether the measurement finish time point T1 is earlier than the job finish time point T3 of the relating job. If the measurement finish time point T1 is earlier than the job finish time point T3 of the relating job, the process proceeds to the step S51. If not, the process returns to the operation acceptance process. In the step S51, the CPU 111 specifies a pre-job that comes immediately before the relating job in the execution order, and the process proceeds to the step S52. In the step S52, the CPU 111 changes the execution order of the relating job such that the relating job comes immediately before the pre-job in the execution order, and the process proceeds to the step S53.

In the step S53, the CPU 111 estimates a job finish time point T3 of the relating job. In the next step S54, the CPU 111 determines whether the measurement finish time point T1 is earlier than the job finish time point T3 of the relating job. If the measurement finish time point T1 is earlier than the job finish time point T3 of the relating job, the process returns to the step S51. If not, the process returns to the operation acceptance process.

Figure 10:
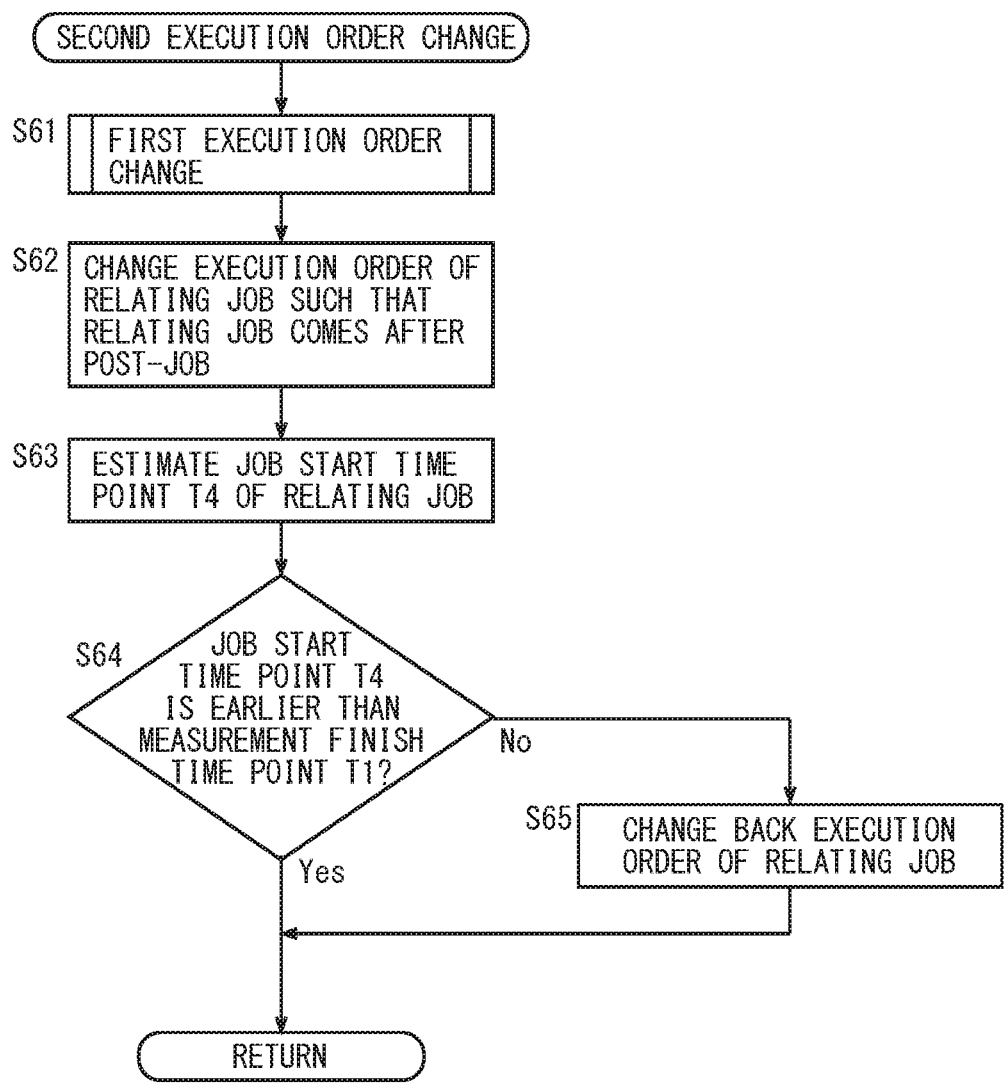
FIG. 10 is a flow chart showing one example of a flow of a second execution order changing process.

FIG. 10 is a flow chart showing one example of a flow of a second execution order changing process. The first execution order changing process is a process executed in the step S05 of the operation acceptance process shown in FIG. 7. Referring to FIG. 10, the CPU 111 executes the first execution order changing process shown in FIG. 9 (step S61), and the process proceeds to the step S62. The first execution order changing process is executed, so that the job finish time point T3 of the relating job is earlier than the measurement finish time point T1. In the next step S62, the CPU 111 changes the execution order of the relating job such that the relating job comes later than a post-job, which comes immediately after the relating job, in the execution order.

In the step S63, the CPU 111 estimates a job start time point T4 at which the execution of the relating job starts. Then, the CPU 111 determines whether the job start time point T4 is earlier than the measurement finish time point T1 (step S64). If the job start time point T4 is earlier than the measurement finish time point T1, the process returns to the operation acceptance process. If not, the process proceeds to the step S65. In the step S65, the execution order of the relating job is changed back, and the process returns to the operation acceptance process. Specifically, the execution order of the relating job is changed such that the relating job comes immediately before a pre-job, which comes immediately before the relating job, in the execution order.

Figure 11:
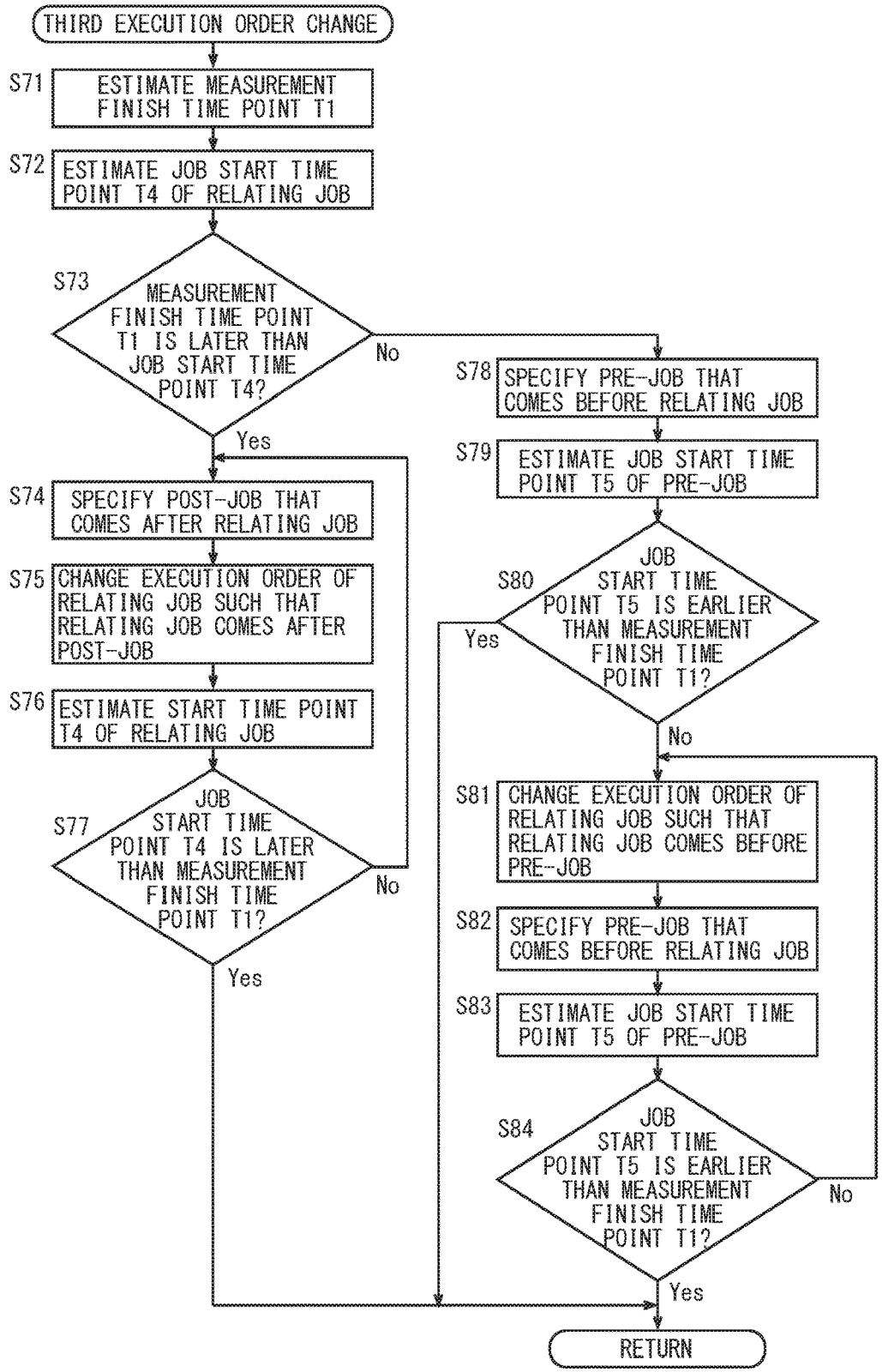
FIG. 11 is a flow chart showing one example of a flow of a third execution order changing process.

FIG. 11 is a flow chart showing one example of a flow of a third execution order changing process. The third execution order changing process is a process executed in the step S05 of the operation acceptance process shown in FIG. 7. Referring to FIG. 11, the CPU 111 estimates a measurement finish time point T1 (step S71). In the next step S72, the CPU 111 estimates a job start time point T4 of the relating job, and the process proceeds to the step S73. In the step S73, the CPU 111 determines whether the measurement finish time point T1 is later than the job start time point T4 of the relating job. If the measurement finish time point T1 is later than the job start time point T4 of the relating job, the process proceeds to the step S74. If not, the process proceeds to the step S78. In the step S74, the CPU 111 specifies a post-job, which comes immediately after the relating job in the execution order. Then, the CPU 111 changes the execution order of the relating job such that the relating job comes immediately after the post-job in the execution order (step S75), and the process proceeds to the step S76.

In the step S76, the CPU 111 estimates a job start time point T4 of the relating job, and the process proceeds to the step S77. In the step S77, the CPU 111 determines whether the job start time point T4 of the relating job is later than the measurement finish time point T1. If the job start time point T4 of the relating job is later than the measurement finish time point T1, the process returns to the operation acceptance process. If not, the process returns to the step S74.

In the step S78, the CPU 111 specifies a pre-job that comes immediately before the relating job in the execution order. Then, the CPU 111 estimates a job start time point T5 of the pre-job (step S79). In the next step S80, the CPU 111 determines whether the job start time point T5 of the pre-job is earlier than the measurement finish time point T1. If the job start time point T5 of the pre-job is earlier than the measurement finish time point T1, the process returns to the operation acceptance process. If not, the process returns to the step S81.

In the step S81, the CPU 111 changes the execution order of the relating job such that the relating job comes immediately before the pre-job in the execution order, and the process proceeds to the step S82. In the step S82, the CPU 111 specifies a pre-job that comes immediately before the relating job in the execution order. Then, the CPU 111 estimates a job start time point T5 of the pre-job (step S83). In the next step S84, the CPU 111 determines whether the job start time point T5 of the pre-job is earlier than the measurement finish time point T1. If the job start time point T5 of the pre-job is earlier than the measurement finish time point T1, the process returns to the operation acceptance process. If not, the process returns to the step S81.

Figure 12:
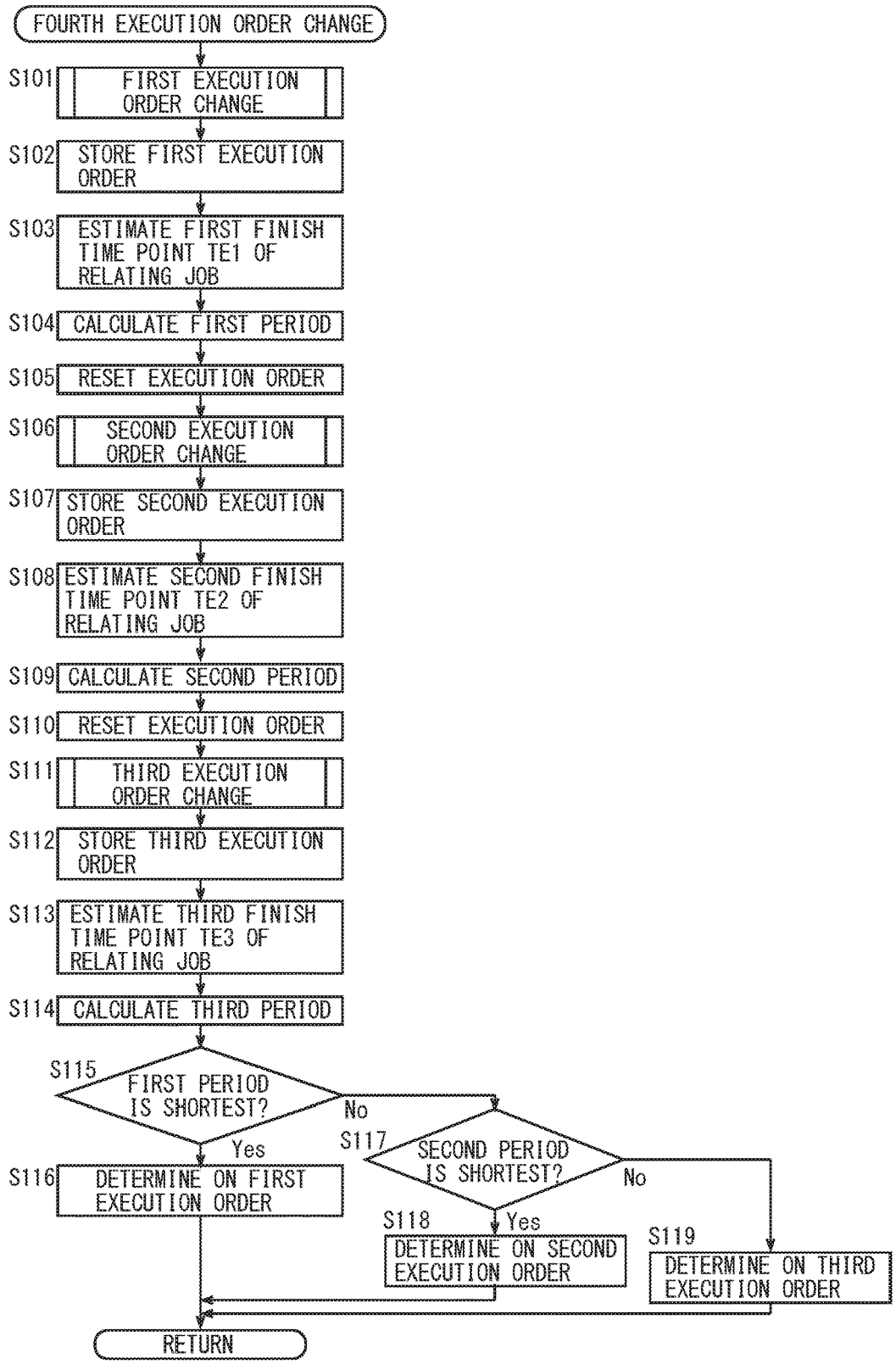
FIG. 12 is a flow chart showing one example of a flow of a fourth execution order changing process.

FIG. 12 is a flow chart showing one example of a flow of a fourth execution order changing process. The fourth execution order changing process is a process executed in the step S05 of the operation acceptance process shown in FIG. 7. Referring to FIG. 12, the CPU executes the first execution order changing process shown in FIG. 9 (step S101), and the process proceeds to the step S102. In the step S102, the CPU 111 stores the execution order that has been changed by the first execution order changing process as the first execution order, and the process proceeds to the step S103. In the step S103, the CPU 111 estimates a first finish time point TE1 at which the execution of the relating job finishes, and the process proceeds to the step S104. In the next step S104, a time period between the first finish time point TE1 and the measurement finish time point is calculated as a first period, and the process proceeds to the step S105.

In the step S105, the CPU 111 resets the execution order, and the process proceeds to the step S106. Thus, the execution order is changed back to the execution order before the step S101 is performed. Then, the CPU 111 executes the second execution order changing process, and the process proceeds to the step S107. In the step S107, the CPU 111 stores the execution order that has been changed by the second execution order changing process as second execution order, and the process proceeds to the step S108. In the step S108, the CPU 111 estimates a second finish time point TE2 at which the execution of the relating job finishes, and the process proceeds to the step S109. In the next step S109, a time period between the second finish time point TE2 and the measurement finish time point is calculated as a second period, and the process proceeds to the step S110.

In the step S110, the CPU 111 resets the execution order, and the process proceeds to the step S111. The execution order is changed back to the execution order before the second execution order changing process is executed in the step S106. Then, the third execution order changing process is executed (step S111), and the process proceeds to the step S112. In the step S112, the execution order, which has been changed by the third execution order changing process, is stored as third execution order, and the process proceeds to the step S113. In the step S113, the CPU 111 estimates a third finish time point TE3 at which the execution of the relating job finishes, and the process proceeds to the step S114. In the next step S114, a time period between the third finish time point TE3 and the measurement finish time point is calculated as a third period, and the process proceeds to the step S115.

In the step S115, the CPU 111 determines whether the first period is the shortest among the first period, the second period and the third period. If the first period is the shortest, the process proceeds to the step S116. If not, the process proceeds to the step S117. In the step S116, the first execution order is determined as the execution order, and the process returns to the operation acceptance process.

In the step S117, the CPU 111 determines whether the second period is the shortest among the first period, the second period and the third period. If the second period is the shortest, the process proceeds to the step S118. If not, the process proceeds to the step S119. In the step S118, the second execution order is determined as the execution order, and the process returns to the operation acceptance process. In the step S119, the third execution order is determined as the execution order, and the process returns to the operation acceptance process.

As explained above, the CPU 111 estimates a job execution time period for execution of each of at least one of the plurality of accepted jobs, and estimates a finish time point at which the analysis of the cardiac potential, which is biometric information, finishes. In response to the start of the measurement of the cardiac potential, the execution order of the relating job is changed such that a time period for the execution of the relating job and the finish time point has a predetermined relationship. Thus, the time point at which the measurement of the cardiac potential of the user finishes and the time period for the execution of the job that relates to the user has a predetermined relationship, so that the time period for the execution of the job can be utilized for the measurement of the cardiac potential. As a result, the user can make use of the waiting time period and have the biometric information measured.

For example, in the case where the execution order of the relating job is changed such that a time point at which the execution of the relating job finishes is closer to the finish time point, a waiting time period of the user can be reduced.

In particular, in the case where the execution order of the relating job is changed such that a time point at which the execution of the relating job finishes is earlier than a finish time point and closest to the finish time point, the execution of the relating job is finished at a time point at which the analysis of a cardiac potential finishes. Therefore, the user can be informed of a result of the execution of the relating job at the time point at which the analysis of the biometric information finishes.

Further, in the case where the execution order of the relating job is changed such that a time point at which the execution of the relating job starts is earlier than a finish time point, and is changed such that a time point at which the execution of the relating job finishes is later than the finish time point, the relating job is under execution at a time point at which the analysis of a cardiac potential finishes. Therefore, the user can view a result of the analysis of the cardiac potential until the execution of the job finishes.

Further, in the case where the execution order of the relating job is changed such that a time point at which the execution of the relating job starts is later than a finish time point and closest to the finish time point, the relating job is executed next after the job under execution at a time point at which the analysis of the cardiac potential finishes. Therefore, the user can view the result of the analysis of the biometric information until the execution of the job finishes.

In the case where the user interrupts the measurement of the cardiac potential, the execution order of the relating job is changed such that the relating job is executed next after the job under execution at the time of the interruption of the measurement. Therefore, the relating job is executed as early as possible after the interruption of the measurement, so that the waiting time period of the user can be reduced.

Further, in the case where an error occurs during the measurement of the cardiac potential and the execution of the relating job, the execution order of the relating job is changed such that the relating job is executed later than the finish time point. Therefore, jobs that come later in the execution order than the relating job can be executed during the measurement of the cardiac potential. Thus, the measurement of the cardiac potential can continue without a reduction in operation rate of the MFP 100.

<Second Embodiment>

The appearance and the hardware configuration of the MFP 100 in the first embodiment are the same as the appearance shown in FIG. 1 and the hardware configuration shown in FIG. 2.

Figure 13:
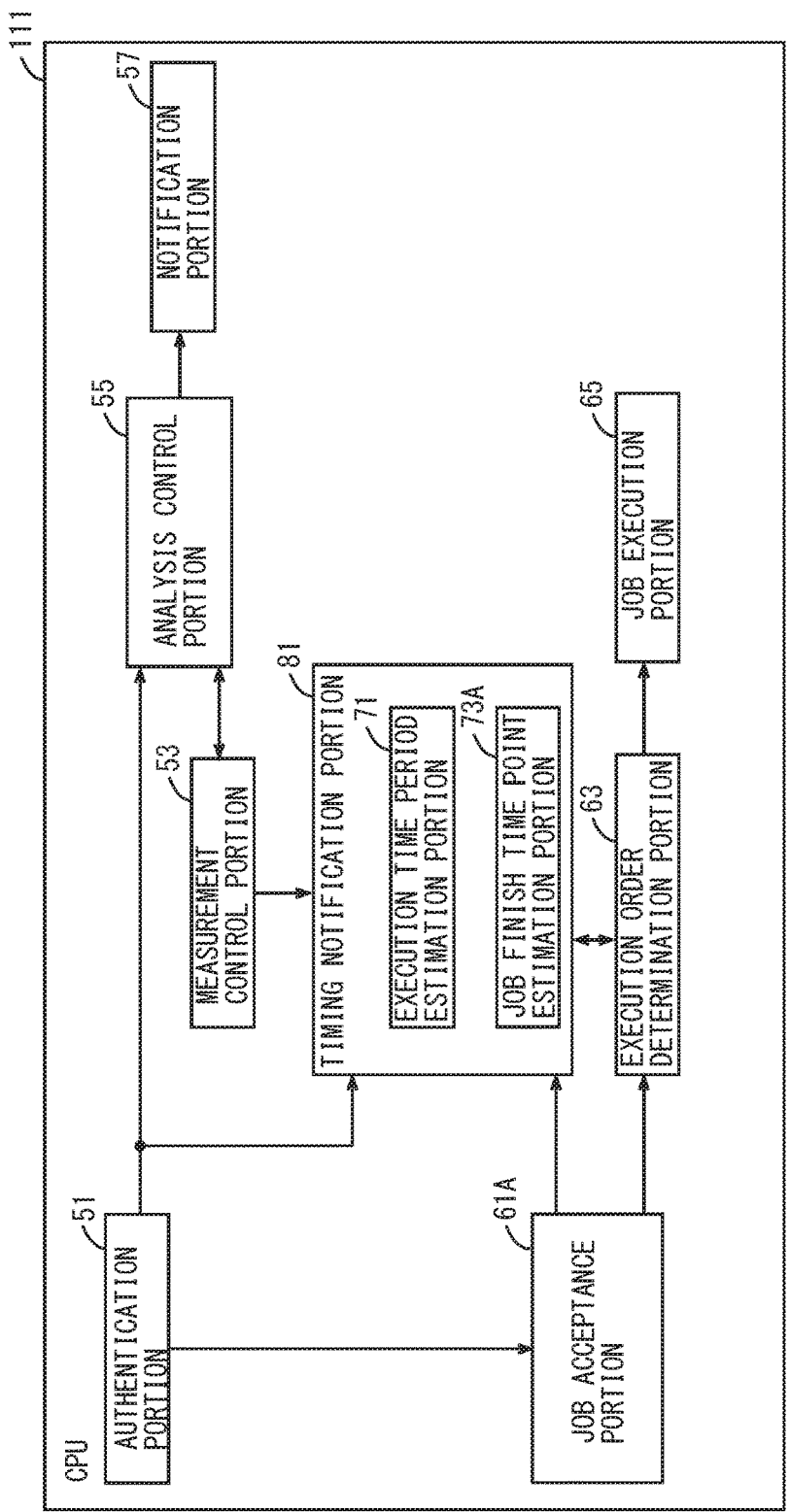
FIG. 13 is a block diagram showing one example of functions of a CPU included in an MFP in a second embodiment.

FIG. 13 is a block diagram showing one example of functions of a CPU included in an MFP in the second embodiment. The functions shown in FIG. 13 are functions formed in the CPU 111 in the case where the CPU 111 included in the MFP 100 executes a job execution control program in the second embodiment stored in the ROM 113, the HDD 115 or the CD-ROM 118.

Referring to FIG. 13, differences from the functions shown in FIG. 4 are that the job acceptance portion 61 is changed to a job acceptance portion 61A, the change portion 59 is deleted, and a timing notification portion 81 is added. The other functions are the same as the functions shown in FIG. 4. Therefore, a description thereof will not be repeated.

In the case where the user operates the operation unit 163 and inputs a job, the job acceptance portion 61A accepts the job accepted by the operation unit 163. The job acceptance portion 61 receives user identification information of the user who operates the operation unit 163 from the authentication portion 51. In the case where the job is accepted by the operation unit 163, the job acceptance portion 61 outputs a set of the accepted job and the user identification information received from the authentication portion 51 to the timing notification portion 81 and the execution order determination portion 63.

In the case where the communication I/F unit 112 receives a print job from an external device, the job acceptance portion 61A specifies a device that has transmitted the print job, and acquires the user identification information of the user who has given instruction to execute the print job from the device. The job acceptance portion 61A outputs a set of the received print job and the acquired user identification information to the timing notification portion 81 and the execution order determination portion 63. The user identification information is sometimes included in the print job. In this case, the job acceptance portion 61A specifies the user who has given instruction to execute the print job from the user identification information included in the print job.

The timing notification portion 81 receives one or more sets of a job and user identification information from the job acceptance portion 61A, and receives a set of the job identification information and the execution order from the execution order determination portion 63. In response to reception of the set of the job and the user identification information from the job acceptance portion 61A, the timing notification portion 81 specifies the job as a relating job that relates to the user specified by the user identification information.

The timing notification portion 81 includes an execution time period estimation portion 71 and a job finish time point estimation portion 73A. In response to reception of the set of the user identification information and the job from the job acceptance portion 61A, the job finish time point estimation portion 73A sets the job as a relating job and estimates a job finish time point at which the execution of the relating job by the job execution portion 65 finishes. The job finish time point estimation portion 73A calculates a total execution time period, of respective job execution time periods estimated by the execution time period estimation portion 71 for one or more jobs that come earlier in the execution order than the relating job, and a job execution time period of the relating job estimated by the execution time period estimation portion 71. Then, the job finish time point estimation portion 73A determines a time point at which the total execution time period has elapsed since the set of the user identification information and the job is received from the job acceptance portion 61A as the job finish time point.

The timing notification portion 81 estimates a measurement time period. The measurement time period is a time period from the time when the measurement control portion 53 starts the measurement of a cardiac potential until the time when the analysis control portion 55 finishes the analysis. In the case where the history information is stored in the HDD 115, the timing notification portion 81 estimates a measurement time period based on the history information associated with the user identification information that makes a set with the relating job. The measurement time period may be an average value or a maximum value of the measurement time periods in the history information associated with the user identification information. Further, in the case where a time period from the time when the measurement control portion 53 starts the measurement of the cardiac potential until the time when the analysis control portion 55 finishes the analysis is defined in advance, the timing notification portion 81 determines a predetermined time period as the measurement time period.

The timing notification portion 81 determines a time point that precedes the job finish time point by the measurement time period as a notification time point. In response to a current time point being the notification time point, the timing notification portion 81 notifies the user specified by the user identification information that makes a set with the relating job. If a computer associated with the user is registered, the timing notification portion 81 controls the communication I/F unit 112, and the notification is made by transmission of a message to the computer associated with the user. Further, if an electronic mail address assigned to the user is registered, the timing notification portion 81 generates an electronic mail addressed to the electronic mail address, controls the communication I/F unit 112 and transmits the electronic mail. The notification message may include the notification about the start of the execution of the job input in the MFP 100, or may prompt the user to have the cardiac potential measured by the MFP 100. Further, it may be a message for notifying the user of the completion of the job after the measurement of the cardiac potential.

Figure 14:
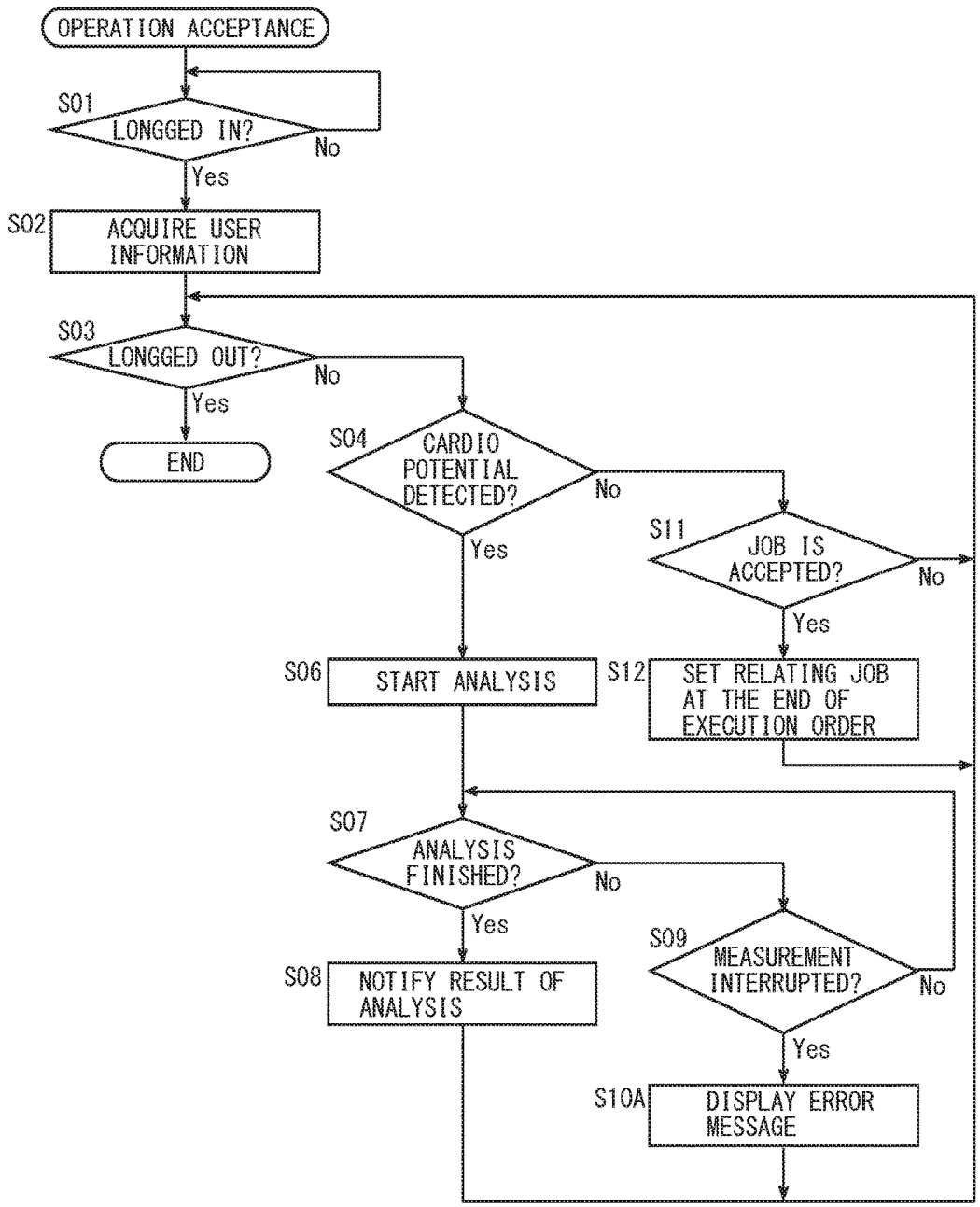
FIG. 14 is a flow chart showing one example of a flow of an operation acceptance process in the second embodiment.

FIG. 14 is a flow chart showing one example of a flow of an operation acceptance process in the second embodiment. Referring to FIG. 14, differences from the operation acceptance process in the first embodiment shown in FIG. 7 are that the step S05 is deleted, and that the step S10 is changed to the step S10A. The other steps are the same as the steps shown in FIG. 7. Therefore, a description thereof will not be repeated. In the step S09, in the case where it is determined that the measurement is interrupted, an error message is displayed in the display unit 161 in the step S10A, and the process returns to the step S03.

FIG. 15 is a flow chart showing one example of a flow of a timing notification process. The timing notification process is a process executed by the CPU 111 in the case where the CPU 111 included in the MFP 100 executes a timing notification program stored in the ROM 113, the HDD 115 or the CD-ROM 118. The timing notification program is part of the job execution control program in the second embodiment. Referring to FIG. 15, the CPU 111 determines whether the job has been received (step S201). If the communication I/F unit 112 receives a job, the process proceeds to the step S202. If not, the process proceeds to the step S208.

In the step S202, the CPU 111 specifies an instructing user who has given instruction to execute the received job, and the process proceeds to the step S203. For example, the CPU 111 specifies the user associated in advance with the device that has transmitted the job as the instructing user. Further, the CPU 111 may make an inquiry to the device that has transmitted the job. Further, in the case where the user identification information of the instructing user is included in the job, the CPU 111 acquires the user identification information. In the step S203, the CPU 111 associates the job received in the step S201 with the instructing user specified in the step S202, and the process proceeds to the step S204. In the step S204, the CPU 111 sets the execution order of the job accepted in the step S201 such that the accepted job is at the end of the wait line, and the process proceeds to the step S205.

In the step S205, the CPU 111 estimates a job finish time point of the relating job received in the step S201. As for the relating job and one or more jobs that come earlier in the execution order than the relating job, the CPU 111 estimates time periods required for execution as job execution time periods. Further, the CPU 111 calculates the total execution time period of the job execution time period of the relating job, and the job execution time periods of one or more jobs that come earlier in the execution order than the relating job, and determines a time point at which the total execution time period has elapsed since a current time point as a job finish time point.

In the next step S206, the CPU 111 determines a time point that precedes the job finish time point by the measurement time period as a notification time point, and the process returns to the step S201. The measurement time period is a time period from the time when the instructing user specified in the step S202 allows the MFP 100 to start measuring the cardiac potential until the time when the analysis of the cardiac potential finishes. In the case where the history information is stored in the HDD 115, the CPU 111 estimates the measurement time period based on the history information associated with the instructing user. The measurement time period may be an average value or a maximum value of the measurement time periods in the history information. Further, in the case where the measurement time period is defined in advance, the predetermined time period is determined as the measurement time period.

In the step S207, the CPU 111 determines whether the job is under execution. If the job is under execution, the process proceeds to the step S208. If not, the process proceeds to the step S210. In the step S208, the CPU 111 selects the job in the first place in the execution order, and the process proceeds to the step S209. In the step S209, the CPU 111 starts the execution of the job selected in the step S208, and the process returns to the step S201.

In the step S210, the CPU 111 determines whether the current time point is the notification time point. If the current time point is the notification time point, the process proceeds to the step S211. If not, the process returns to the step S201. In the step S211, the instructing user is notified, and the process returns to the step S201. Specifically, if a computer associated with the instructing user is registered, the CPU 111 controls the communication I/F unit 112, and transmits a message to the computer associated with the instructing user. Further, if an electronic mail address assigned to the user is registered, the CPU 111 generates an electronic mail addressed to the electronic mail address, controls the notification I/F unit 112, and transmits the electronic mail. The notification message is "JOB STARTS NOW", "CHECK YOUR HEALTH STATE" or "CHECK YOUR HEALTH STATE NOW AND JOB WILL BE FINISHED AT END OF HEALTH CHECK", for example.

Figure 16:
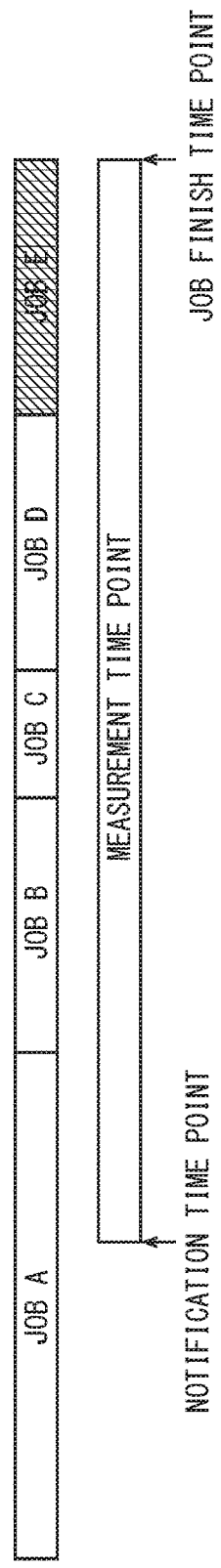
FIG. 16 is a diagram for explaining a notification time point.

FIG. 16 is a diagram for explaining the notification time point. Referring to FIG. 16, a transverse direction indicates a time axis, and a state of temporally arrangement of the jobs A to E before the measurement of the cardiac potential starts is shown. The job A is under execution, and the jobs B to E are set in a wait line. The job to which hatching is applied is taken as a relating job that relates to the user whose cardiac potential is measured. The time point at which the execution of the job E finishes is a job finish time point, and a time point that precedes the job finish time point by the measurement time point is the notification time point. If the notified user logs in the MFP 100 and has the cardiac potential measured, in the case where the user can view a result of the analysis, the job E is finished. Therefore, the user can have the cardiac potential measured without being informed of the time point at which the execution of the job E finishes. Further, there can be no waiting time period for waiting to be informed of the result of the execution of the job E.

The MFP 100 in the second embodiment estimates a completion time point at which the execution of the accepted job completes, estimates the measurement time period from the start of the measurement of the cardiac potential until the analysis is finished, and notifies the instructing user who has given instruction to execute the job of a time point that precedes the completion time point by the measurement time period. Therefore, the user can be informed of timing for allowing the time period for analysis of the cardiac potential to overlap with the time period during which the job is executed. Thus, the user can acquire a sheet of paper that is output as a result of the execution of the job by moving to the MFP 100 and have the cardiac potential measured. As a result, the number of times the user travels to the MFP 100 can be reduced.

Although the present invention has been described and illustrated in detail, it is clearly understood that the same is by way of illustration and example only and is not to be taken by way of limitation, the spirit and scope of the present invention being limited only by the terms of the appended claims.

<Appendix Notes>

(1) In the image forming apparatus according to another aspect of the invention:

in the case where a time point at which execution of a job, which comes later in order than the relating job, finishes is earlier than the finish time point, the order of the relating job is changed such that the relating job comes after the job, which comes later in the order than the relating job, until a time point at which execution of a job, which comes later in the order than the relating job, finishes is later than the finish time point, and in the case where a time point at which execution of the relating job finishes is later than the finish time point, the execution order of the relating job is changed such that the relating job comes before a job, which comes earlier than the relating job in the order, until a time point at which the execution of the relating job finishes is earlier than the finish time point.

(2) In the image forming apparatus according to another aspect of the invention:

in the case where a time point at which execution of a job, which comes later in order than the relating job, finishes is later than the finish time point, and a time point at which, after the order of the relating job is changed such that the relating job comes after a job that comes later in the order than the relating job, execution of the relating job starts is earlier than the finish time point, the order of the relating job is changed such that the relating job comes after a job, which comes later in the order than the relating job.

(3) In the image forming apparatus according to another aspect of the invention:

the changer, in the case where a time point at which execution of the relating job starts is earlier than the finish time point, changes execution order of the relating job such that the relating job comes after a job, which comes later in the order than the relating job, until the time point at which the execution of the relating job starts is later than the finish time point, and the changer, in the case where a time point at which the execution of the relating job starts is later than the finish time point, changes the execution order of the relating job such that the relating job comes before a job, which comes earlier in the order than the relating job, until a time point at which execution of a job, which comes earlier in the order than the relating job, starts is earlier than the finish time point.

(4) And in the image forming apparatus according to another aspect of the invention:

the execution time period estimator estimates a job execution time period of a job under execution by the job executor at a time point at which measurement by the measurer is started.

What is claimed is:

1. An image forming apparatus comprising:
a hardware processor which is configured to:
measure biometric information of a user;
analyze the measured biometric information;
accept jobs;
execute the accepted jobs;
estimate a job execution time period during which each of at least one of a plurality of the accepted jobs is executed;
estimate a finish time point at which the analysis finishes, and
in response to a start of the measurement of the biometric information, change an execution order of a relating job, which relates to the user who is a subject of the measurement, among the plurality of jobs such that a period during which the relating job is executed and the finish time point have a predetermined relationship.

2. The image forming apparatus according to claim 1, wherein the hardware processor is configured to change the execution order of the relating job such that a time point at which execution of the relating job finishes is closer to the finish time point.

3. The image forming apparatus according to claim 2, wherein the hardware processor is configured to change the execution order of the relating job such that a time point at which the execution of the relating job finishes is earlier than the finish time point and closest to the finish time point.

4. The image forming apparatus according to claim 2, wherein the hardware processor is configured to change the execution order of the relating job such that a time point at which the execution of the relating job starts is earlier than the finish time point, and change the execution order of the relating job such that a time point at which the execution of the relating job finishes is later than the finish time point.

5. The image forming apparatus according to claim 2, wherein the hardware processor is configured to change the execution order of the relating job such that a time point at which the execution of the relating job starts is later than the finish time point and closest to the finish time point.

6. The image forming apparatus according to claim 1, wherein the hardware processor is configured to, in the case where the measurement is interrupted in a stage before the analysis finishes since the measurement is started, change the execution order of the relating job such that the relating job is executed next after a job under execution at a time point at which the measurement is interrupted.

7. The image forming apparatus according to claim 1, wherein the hardware processor is configured to, in the case where an error occurs during execution of the relating job in a stage before the analysis finishes since the measurement is started, change the execution order of the relating job such that the relating job is executed later than the finish time point.

8. A non-transitory computer-readable recording medium encoded with a job execution control program that is executed by a computer controlling an image forming apparatus, the job execution control program causing the computer to execute:
a measurement step of measuring biometric information of a user;
an analysis step of analyzing the measured biometric information;
a job acceptance step of accepting jobs;
a job execution step of executing the jobs in order of acceptance in the job acceptance step;
an execution time period estimation step of estimating a job execution time period during which at least each of one of a plurality of jobs accepted in the job acceptance step is executed in the job execution step;
a finish time point estimation step of estimating a finish time point at which the analysis finishes in the analysis step; and
a changing step of, in response to start of measurement of the biometric information in the measurement step, changing execution order of a relating job that relates to the user who is a subject of the measurement in the measurement step among the plurality of jobs such that a period during which the relating job is executed and the finish time point have a predetermined relationship.

9. The non-transitory computer-readable recording medium encoded with the job execution control program according to claim 8, wherein the job execution control program causes the computer to change the execution order of the relating job such that a time point at which execution of the relating job finishes is closer to the finish time point.

10. The non-transitory computer-readable recording medium encoded with the job execution control program according to claim 9, wherein the job execution control program causes the computer to change the execution order of the relating job such that a time point at which the execution of the relating job finishes is earlier than the finish time point and closest to the finish time point.

11. The non-transitory computer-readable recording medium encoded with the job execution control program according to claim 9, wherein the job execution control program causes the computer to change the execution order of the relating job such that a time point at which the execution of the relating job starts is earlier than the finish time point, and change the execution order of the relating job such that a time point at which the execution of the relating job finishes is later than the finish time point.

12. The non-transitory computer-readable recording medium encoded with the job execution control program according to claim 9, wherein the job execution control program causes the computer to change the execution order of the relating job such that a time point at which the execution of the relating job starts is later than the finish time point and closest to the finish time point.

13. The non-transitory computer-readable recording medium encoded with the job execution control program according to claim 8, wherein the job execution control program causes the computer to, in the case where the measurement in the measurement step is interrupted in a stage before the analysis in the analysis step finishes since the measurement in the measurement step is started, change the execution order of the relating job such that the relating job is executed next after a job under execution at a time point at which the measurement in the measurement step is interrupted.

14. The non-transitory computer-readable recording medium encoded with the job execution control program according to claim 8, wherein the job execution control program causes the computer to, in the case where an error occurs during execution of the relating job in a stage before the analysis in the analysis step finishes since the measurement in the measurement step is started, change the execution order of the relating job such that the relating job is executed later than the finish time point.

* * * * *